US011884579B2

(12) United States Patent
Rijo Da Costa Carvalho et al.

(10) Patent No.: US 11,884,579 B2
(45) Date of Patent: Jan. 30, 2024

(54) PROCESS FOR MODIFICATION OF A SOLID SURFACE

(71) Applicant: SURFIX B.V., Wageningen (NL)

(72) Inventors: Rui Pedro Rijo Da Costa Carvalho, Wageningen (NL); Anke Kristin Schutztrilling, Wageningen (NL); Adriaan Martin Hubert Henri Van Der Meer, Wageningen (NL); Johannes Teunis Zuilhof, Wageningen (NL); Wout Knoben, Wageningen (NL); Luc Maria Wilhelmus Scheres, Wageningen (NL)

(73) Assignee: SURFIX B.V., Wageningen (NL)

( * ) Notice: Subject to any disclaimer, the term of this patent is extended or adjusted under 35 U.S.C. 154(b) by 395 days.

(21) Appl. No.: 16/967,846

(22) PCT Filed: Feb. 8, 2019

(86) PCT No.: PCT/EP2019/053115
§ 371 (c)(1),
(2) Date: Aug. 6, 2020

(87) PCT Pub. No.: WO2019/154978
PCT Pub. Date: Aug. 15, 2019

(65) Prior Publication Data
US 2021/0032426 A1    Feb. 4, 2021

(30) Foreign Application Priority Data
Feb. 8, 2018    (EP) .................................... 18155697

(51) Int. Cl.
*C03C 17/30*    (2006.01)
*C09D 7/40*    (2018.01)
(Continued)

(52) U.S. Cl.
CPC ............... *C03C 17/30* (2013.01); *C08J 7/043* (2020.01); *C08J 7/0427* (2020.01); *C08J 7/056* (2020.01);
(Continued)

(58) Field of Classification Search
CPC . C03C 17/30; C03C 2217/76; C03C 2218/31; C09D 7/67; C09D 7/63;
(Continued)

(56) References Cited

U.S. PATENT DOCUMENTS 5,429,708 A    7/1995    Linford et al.
6,331,329 B1   12/2001   McCarthy et al.
(Continued)

FOREIGN PATENT DOCUMENTS

CN    102971380 A    3/2013
CN    101903483 A    10/2017
(Continued)

OTHER PUBLICATIONS

Japanese Office Action dated Sep. 27, 2022 for family member Application No. 2020-542827.
(Continued)

*Primary Examiner* — Robert S Walters, Jr.
(74) *Attorney, Agent, or Firm* — Hudak, Shunk & Farine Co. LPA

(57) ABSTRACT

A process for the modification of a surface of a solid material, having the step of contacting the surface with a surface-modifying composition under irradiation with light of a wavelength in the range of 200 to 800 nm optionally in the presence of a photoinitiator, wherein the solid material has surface groups selected from C—OH, Si—OH, C═O and C—O—C groups and wherein the surface-modifying composition has at least a hydrosilane and at least one reactive compound (A) other than the hydrosilane, wherein
(Continued)

the reactive compound (A) has at least two functional groups selected from (meth)acrylate, (meth)acrylamide, hydroxyl, carboxylic acid, alkene, alkyne and epoxy, and wherein the amount of hydrosilane in the composition ranges between 0.5 and 99 vol %, and wherein the vol % is determined at 20° C. relative to the total of the surface modifying composition. A solid material having a partial surface modification layer.

15 Claims, 4 Drawing Sheets

(51) Int. Cl.
C09D 7/63 (2018.01)
C08J 7/04 (2020.01)
C09D 4/00 (2006.01)
C08J 7/043 (2020.01)
C08J 7/056 (2020.01)

(52) U.S. Cl.
CPC ............... *C09D 4/00* (2013.01); *C09D 7/63* (2018.01); *C09D 7/67* (2018.01); *C03C 2217/76* (2013.01); *C03C 2218/31* (2013.01); *C08J 2333/08* (2013.01)

(58) Field of Classification Search
CPC . C09D 4/00; C08J 7/0427; C08J 7/056; C08J 7/043; C08J 2333/08
See application file for complete search history.

(56) References Cited

U.S. PATENT DOCUMENTS

| 6,524,655 | B2 | 2/2003 | McCarthy et al. |
| 6,673,459 | B2 | 1/2004 | McCarthy et al. |
| 8,221,879 | B2 | 7/2012 | Zuilhof et al. |
| 8,481,435 | B2 | 7/2013 | Schroen et al. |
| 8,993,479 | B2 | 3/2015 | Zuilhof et al. |
| 2017/0297018 | A1 | 10/2017 | Rijo da Costa Carvalho et al. |

FOREIGN PATENT DOCUMENTS

| EP | 3207992 | A1 | 8/2017 |
| WO | 03078159 | A1 | 9/2003 |
| WO | 2006046699 | A1 | 5/2006 |
| WO | 2009079647 | A1 | 6/2009 |
| WO | 2012084992 | A1 | 6/2012 |
| WO | 2015136913 | A1 | 9/2015 |

OTHER PUBLICATIONS

Chinese Office Action dated Mar. 8, 2022 for family member Application No. 201980021589.4.
Helmy, R., Reaction of Organosilicon Hydrides with Solid Surfaces: An Example of Surface-Catalyzed Self-Assembly, J. Am. Chem. Soc, 2004, vol. 126, pp. 7595-7600.
Carvalho, R., Local Light-Induced Modification of the Inside of Microfluidic Glass Chips, Langmuir, 2016, vol. 32, pp. 2389-2398, American Chemical Society.
Pujari, S., Covalently Attached Organic Monolayers onto Silicon Carbide from 1-Alkynes: Molecular Structure and Tribological Properties, Langmuir, 2013, vol. 29, pp. 4019-4031, American Chemical Society.
Steindl, J., Silane-Acrylate Chemistry for Regulating Network Formation in Radical Photopolymerization, Macromolecules, 2017, vol. 50, pp. 7448-7457, American Chemical Society.
Lalevee, J., Silanes as New Highly Efficient Co-initiators for Radical Polymerization in Aerated Media, Macromolecules, 2008, vol. 41, pp. 2003-2010, American Chemical Society.

A

B

PROCESS FOR MODIFICATION OF A SOLID SURFACE

FIELD OF THE INVENTION

The present invention relates to a process for the modification of a surface of a solid material. The present invention further relates to the surface-modified solid material obtainable by such process and its applications.

BACKGROUND OF THE INVENTION

Surface modification plays an important role in micro- and nanotechnology, as it provides materials and devices with essential properties such as biorecognition, antifouling, and/or (anti)wetting. For many applications it is beneficial to have local control of these properties, i.e. patterns of different functionalities on the surface. Examples include biosensors, microfluidics and substrates for microarrays or cell studies. However, using well-known surface modification technologies such as self-assembled monolayers of (chloro- or alkoxy)silanes or thiols, patterning can only be achieved by complex and time-consuming lithographic processes.

For the preparation of patterned surfaces, a photochemical surface modification method is desirable, as this allows direct constructive patterning by radiating the substrate through a photomask. Several alternative methods for photochemical surface modification are known. For example, light-initiated formation of organic monolayers of alkenes and alkynes on H-terminated (etched) silicon is known from U.S. Pat. No. 5,429,708. Later, it was found that also other etched silicon (and germanium) based materials such as $Si_3N_4$ and SiC could be modified in a similar way, as described in U.S. Pat. Nos. 8,481,435 and 8,221,879. Also, it has been shown in U.S. Pat. No. 8,993,479 that alkenes/alkynes can be photochemically attached to hydroxyl-terminated surfaces (e.g. glass).

Even though these methods are useful for preparing patterned surfaces, there are several drawbacks to the photochemical surface modification by alkene/alkyne monolayers. Most importantly, the preparation of high-quality monolayers is slow (more than 10 hours), thus limiting the practical applicability of the method. Further these modifications should be carried out in the absence of $O_2$ and $H_2O$, which reduces the practical application of this method. Moreover, modification of oxide surfaces in the absence of a photoinitiator requires UV radiation at wavelengths of less than 275 nm (typically 254 nm is used), which can cause compatibility issues with biomolecules and substrate materials.

Recently, a two-step surface modification route was reported, allowing light with a longer wavelength (302 nm) to be used for the formation of alkene monolayers on hydrogen-terminated glass (H-glass) (R. Rijo Carvalho, S. P. Pujari, S. C. Lange, R. Sen, E. X. Vrouwe, and H. Zuilhof, "Local Light-Induced Modification of the Inside of Microfluidic Glass Chips", Langmuir 32 (2016) 2389-2398). However, the introduction of Si—H groups at the surface requires an extra step and thus adds complexity. Moreover, the reaction of the alkene is slow and takes 16 h.

Surface modification using hydrosilanes (also referred to as hydridosilanes or silicon hydrides) has been proposed as an alternative to conventional chloro- or alkoxysilane-based methods. Hydrosilanes are more stable in ambient conditions and therefore easier to purify and handle. Moreover, they are compatible with a wider range of terminal functional groups. Hydrosilane layers have been prepared on various metal oxide surfaces, as described in U.S. Pat. Nos. 6,331,329, 6,524,655 and 6,673,459. However, long reaction times at elevated temperature are required to obtain high-quality layers. Moreover, it was found that the metal oxide surface plays a catalytic role and therefore hydrosilanes are found not to react with non-metal surfaces such as $SiO_2$, carbon black and organic polymers at room temperature (R. Helmy, R. W. Wenslow, and A. Y. Fadeev, "Reaction of Organosilicon Hydrides with Solid Surfaces: An example of Surface-Catalyzed Self-Assembly", J. Am. Chem. Soc. 126 (2004) 7595-7600).

WO2015136913 discloses a method for producing a surface-modified substrate which includes a step for bringing into contact, in the presence of a borane catalyst, a substrate having polar groups present on the surface thereof and a hydrosilane compound having an Si—H group in which a hydrogen atom is bound to a silicon atom, and causing a dehydrogenation condensation reaction to advance between the substrate, having Si—OH groups, and the compound. Using this approach, modification of silica surfaces can be achieved in a few minutes at room temperature. However, since the reaction requires a homogeneous catalyst, surface modification takes place on the whole surface and results only in very thin monolayer type layers with thicknesses in the range of 1-2 nm. The method is therefore not suitable for the preparation of patterned layers and/or thicker surface modification layers, for example between 2 and 500 nm.

Outside the field of chemical surface modification, the use of certain hydrosilanes in bulk radical photopolymerization processes has been described. Macromolecules 2017, 50, 7448-7457 describes silane-acrylate chemistry toward spatially resolved organosilicon compounds. In this publication bulk polymeric networks are synthesized (at 0.5 wt. % photoinitiator concentration). Use is made of organosilicon compounds having two Si—H groups, each surrounded by two bulky trimethylsilyl groups, which act as chain transfer agent during polymerization. Solely examples of bulk polymerization are given, but such a bulk polymerization process is not suitable for the surface modification of substrates. No examples are given for the chemical surface coupling of hydrosilanes and/or for surface modification of substrates and/or change of surface properties of substrates.

Macromolecules 2008, 41, 2003-2010 discloses a number of hydrosilanes as co-initiators for radical bulk polymerization in aerated media. Solely examples of bulk polymerization of diacrylates, by exciting the photoinitiator (1.0 wt. %), are given. No examples are given for the chemical surface coupling of hydrosilanes and/or for surface modification of substrates and/or change of surface properties of substrates.

SUMMARY OF THE INVENTION

There is therefore a need for the development of improved photochemical surface modification methods. The improvements may be a reproducible, light-induced reaction with short reaction times using a surface-modifying composition with low optical density. Other improvements may be a large contrast between modified and non-modified surfaces and a good lateral resolution when irradiated locally by means of a photomask.

The invention provides a process for the modification of a surface of a solid material, comprising the step of contacting the surface with a surface-modifying composition under irradiation with light of a wavelength in the range of 200 to 800 nm optionally in the presence of a photoinitiator, wherein the solid material has surface groups selected from C—OH, Si—OH, C═O and C—O—C groups and wherein the surface-modifying composition comprises at least a hydrosilane and at least one reactive compound (A) other than the hydrosilane. The modification of the surface of the solid material can be performed without the application of an additional primer or adhesion promotor to the surface in order to improve the adhesion of the surface modification layer.

It is believed that the hydrogen atom bound to the silicon atom of the hydrosilane gives rise to a photoinitiated chemical surface coupling reaction with the C—OH, Si—OH, C=O or C—O—C groups on the surface of the solid material. It is believed that a photoactivation takes place of the Si—H bond of the hydrosilanes close to the surface of the substrate. The activated hydrosilane reacts with the surface of the substrate thereby forming a locally modified surface.

The process according to the invention provides a number of improvements over known methods for chemical surface modification.

It was surprisingly found that a surface modification according to the invention can be carried out on a variety of different substrate materials. In particular, a surface modification involving a chemical surface coupling reaction was found to take place at room temperature in the absence of a catalyst, primer or adhesion promoter, by performing the contacting step under irradiation with light. This is particularly surprising in view of the fact that a chemical surface coupling reaction between hydrosilanes and non-metal surfaces was known not to occur at room temperature, as described in J. Am. Chem. Soc. 126 (2004) 7595-7600.

The process according to the invention is catalyst free, and allows a spatially selective surface modification by selective irradiation with light, for example by use of a mask, for example a photomask. Accordingly, in some preferred embodiments of the process of the invention, a predetermined part of the surface is selectively subjected to the irradiation. Preferably, a photomask or a mask that may be in direct contact with the solid material selectively blocks a predetermined part of the surface from being irradiated, resulting in selective modification of that part of the surface that is not blocked by the mask, i.e. patterning of the surface.

The ability to perform a photochemical surface modification according to the present invention enables the patterning of said surface. In a further preferred embodiment, the process according to the invention is applied for the selective modification, with a predetermined pattern, of the surface of spatially confined microchannels on or below the surface of a solid material. Thus in one embodiment the modified surface is the surface of spatially confined microchannels, on and/or under the outer surface of the solid material.

Furthermore, the presence of reactive compound (A) in the surface modifying composition allows the formation of thicker surface modification layers (for example between 2 and 500 nm, preferably between 5 and 250 nm) than the molecular monolayers obtained by known chemical surface modification methods.

Despite the low molar absorption coefficients of the hydrosilanes, providing a low optical density, the reaction times are surprisingly short compared to reaction times for known photochemical surface modification methods (e.g. the process described in U.S. Pat. No. 8,993,479), even without a photoinitiator.

The process according to the invention comprises the step of contacting the surface with a surface-modifying composition under irradiation with light of a wavelength in the range of 200 to 800 nm, optionally in the presence of a photoinitiator.

Irradiation

The contacting of the solid material and the surface-modifying composition is carried out under irradiation with light of a wavelength in the range of 200 to 800 nm. This may be carried out in the presence of a photoinitiator or in the absence of a photoinitiator. The presence of a photoinitiator is suitable for initiating or further accelerating the reaction when necessary, provided that the optical density of the surface-modifying composition remains low. This is required in order to minimize internal filtering effects and bulk polymerization, which may prevent photochemical surface coupling to take place For example, when the light has a wavelength in the range of 300 to 800 nm, the irradiation is preferably carried out in the presence of a photoinitiator.

In some preferred embodiments of the invention, the irradiation is carried out in the absence of a photoinitiator and the light has preferably a wavelength in the range of 260 nm to 300 nm, more preferably 280 nm to 300 nm. This advantageously provides a low optical density surface-modifying composition and avoids compatibility issues with biomolecules and substrate materials.

In some preferred embodiments of the invention, the irradiation is carried out in the presence of a photoinitiator and under irradiation with light of a wavelength in the range of 300 to 800 nm, preferably with a wavelength lower than 700 nm, or lower than 600 nm, or lower than 500 nm, or lower than 400 nm, more preferably lower than 380 nm, even more preferably lower than 350 nm and in particular lower than 330 nm.

Depending on the type of the surface-modifying composition and the surface, desirable results may also be obtained by irradiation with light having a wavelength in the range of 300 to 800 nm in the absence of a photoinitiator.

Examples of suitable photoinitiators include, but are not limited to, organic peroxides, propiophenones, alkyl bromides, benzyl iodides, 2,2-dimethoxy-2-phenyl acetophenone, benzophenone and the like. The amount of photoinitiator present in the reaction mixture may be in the range of 0 to 5.0 wt. %, more preferably in the range of 0.001 to 1 wt %, even more preferably in the range of 0.01 to 0.2 wt. %, and in particular in the range of 0.01 to 0.1 wt. %, relative to the surface-modifying composition.

The surface modifying composition can be contacted with the solid material by different deposition methods, e.g. pipetting, dipcoating, spraycoating, or spincoating.

The process according to the present invention is applicable to various types of solid materials. A solid material is defined as a material that is in the solid state at ambient temperature, e.g. 20° C. The solid material can be defined as a substrate.

The process according to the present invention may be applied on various different types of surfaces, both planar and curved, and examples comprise particles (e.g. micro- or nanoparticles), powders, crystals, films or foils.

Solid Material

The solid material to be surface modified in the process according to the present invention has surface groups selected from C—OH, C=O, C—O—C or Si—OH groups.

Examples of C=O groups are ketone, ester, carbonate, amide and urethane groups. Examples of solid materials having surface groups selected from C—OH, C=O, C—O—C or Si—OH groups are polyesters, polyethers, polyketones, polycarbonates, polyamides, polyurethanes, epoxyresins, polyalcohols, (meth)acrylate and meth)acrylamide polymers, polyetherimides and silica containing solids.

Examples of suitable solid materials having a surface having Si—OH groups include silica and glass (such as synthetic fused silica and borosilicate glass), quartz, oxidized silicon, oxidized silicon nitride, oxidized silicon carbide and plastics and polymers provided on the surface with a film of silica, glass, oxidized silicon, oxidized silicon nitride or oxidized silicon carbide. The surface of the solid material can be activated to contain Si—OH groups.

Examples of suitable solid materials having a surface having C—OH groups include etched silicon carbide and natural polymers such as polysaccharides (e.g. (nitro)cellulose) and paper and synthetic polymers such as poly(vinyl alcohol). An example of silicon carbide having C—OH terminated surfaces prepared by etching with HF is described in Langmuir 2013, 29, 4019-4031.

Examples of suitable solid materials having a surface having C—O—C groups, that is ether and epoxy groups, include solid materials that have been treated with an epoxy silane compound, and epoxy polymers like for example negative photoresist SU-8, and polyethers like poly(ethylene glycol) (PEG), poly(propylene glycol (PPG) and polyethersulfone (PES).

Examples of suitable solid materials have a surface having C=O groups, that is ester, carbonate, ketone, urethane groups, include polyesters like polyethylene terephthalate (PET), (meth)acrylic and (meth)acrylamide polymers like polymethylmethacylate (PMMA), polycarbonates, polyurethanes, polyamides like nylon and aramide, polyetherimide (PEI), polyether ketone (PEEK), and the like.

Examples of suitable solid materials not having C—OH, C=O or C—O—C surface groups in their native state, that is diamond, graphite, graphene, or plastics and organic polymers such as polyethene, polypropylene and cyclic olefin copolymers. The surface of these solid materials can be activated to contain C—OH and/or C=O and/or C—O—C groups.

Pretreatment of Surface

The solid material can be subjected to a pretreatment step prior to the irradiation step. The surface of the solid material may be activated to increase the concentration of Si—OH, and/or C—OH and/or C=O and/or C—O—C groups, but it is also possible to use solid materials without any surface activation. Optionally, the pretreatment step comprises exposure to $O_2$ plasma, and/or application of oxidizing solution, like piranha solution (mixture of sulfuric acid and hydrogen peroxide), and/or contacting the surface with a mixture comprising an acid, and/or an organic solvent.

In some embodiments, the process comprises the step of treating the surface to have micro- and/or nanoscale surface roughness before the irradiation step. This can be realized in many ways, e.g. casting (nano)particle solutions, sol-gel processes, and chemical vapor deposition (CVD) to prepare roughness in the order of micro- and nanometers on the surface.

By introducing a certain degree of roughness to an already hydrophilic surface, the surface may become superhydrophilic, i.e. the surface has a water contact angle of less than 15°, more preferably less than 5°. If such a superhydrophilic surface is treated with a hydrophobic surface-modifying composition in the irradiation step according to the invention, the irradiated surface may become very hydrophobic, i.e. the irradiated surface has a water contact angle of more than 140°, more preferably superhydrophobic having a water contact angle of more than 150°. Thus, a very large wettability contrast can be obtained between irradiated and non-irradiated surfaces.

The step of introducing micro- and/or nanoscale surface roughness may also improve other surface properties, like increased immobilisation of biomolecules and improved antifouling properties, by increasing the number/fraction/surface density of surface-bound molecules.

Surface-Modifying Composition

The process according to the present invention applies a surface-modifying composition. The surface-modifying composition comprises at least a hydrosilane and a reactive compound (A) having at least two reactive groups. The reactive compound (A) is a compound other than the hydrosilane and is reactive towards the hydrosilane.

The surface-modifying composition may contain a mixture of different hydrosilanes. The surface-modifying composition may contain a mixture of different reactive compounds (A).

The amount of hydrosilane in the composition ranges between 0.5 and 99 vol %, relative to the volume of the composition at 20° C. Preferably the amount of hydrosilane ranges between 1 and 99 vol % (at 20° C.), more preferably between 4 and 98 vol %.

The amount of reactive compound (A) preferably ranges between 1 and 50 vol %. A solvent can be present in a range between 0 and 95 vol %, preferably in a range between 40-90 vol %.

The amount of hydrosilane and compound (A) together preferably ranges between 10-100 vol % of the surface-modifying composition, more preferably between 20 and 60 vol %.

The vol % of components is determined at 20° C. and is calculated relative to the total volume of the surface modifying composition, unless stated otherwise.

The surface modifying composition may contain reactive components other than the hydrosilane and reactive compound (A). Examples of these other components are alcohols, mono-acrylates, mono-alkenes, mono-alkynes, mono-epoxies, and the like.

Optionally the surface-modifying composition comprises additives in an amount between 0 and 10 wt. % relative to the total weight of the composition, optionally also micro- and nanoparticles and optionally also a solvent.

The surface-modifying composition may comprise a photoinitiator as described above.

The surface-modifying composition may comprise a suitable inert solvent. In this case, the amount of the solvent in the surface-modifying composition may be selected within a broad range, for example 0.5-99.5 vol %, 10-90 vol % or 25-75 vol %, of the surface-modifying composition. For a hydrophobic surface modification a solvent with comparable polarity is desirable, for instance aliphatic, chlorinated or fluorinated solvents. For a hydrophilic surface modification a solvent with comparable polarity is desirable, for instance isopropyl alcohol, propanol, methanol, diethyleneglycol dimethyl ether, tetraethylene glycol dimethyl ether, acetonitrile, dimethylformamide, dimethylsulfoxide and water. Preferably solvents are used that do not dissolve the solid substrate and do dissolve all components of the surface-modifying composition.

The surface-modifying composition may comprise microparticles and/or nanoparticles. Preferably, the microparticles and nanoparticles have a number average diameter of 0.1 nm to 10 µm, 1 nm to 1 µm or 10 nm to 100 nm, as determined according to SEM. The particles may have Si—OH or C—OH termination or are being modified with compounds reactive towards the surface-modifying composition. The amount of such particles may be selected within a broad range, for example 0.1-99.9 wt. %, 10-90 wt. % or 25-75 wt. %, of the surface-modifying composition.

The composition and relative amounts of hydrosilane and reactive compound (A) may differ depending on the desired surface properties, and the surface of the solid to be modified.

For example when a hydrophobic surface modification layer is prepared, the hydrosilane can range from 50-99 vol %, for example it can range from 70-99 vol %. The reactive compound (A) may range from 1-50 vol %, preferably between 1 and 25 vol %. In these systems, the amount of solvent is usually low, for example between 0 and 30 vol %. It has been found that it is also possible to work in diluted systems and to add more solvent, for example up to 90 vol %. In that case the amount of hydrosilane can be between 8-50 vol %, and the amount of compound (A) may range from 1-20 vol %. Examples of hydrophobic hydrosilanes and reactive compounds (A) are compounds having aliphatic or fluorinated substituents.

For example when a hydrophilic surface modification layer is being prepared, the amount of hydrosilane compound may range between 1 and 50 vol %, the amount of reactive compound (A) between 5 and 50 vol %, and the amount of solvent between 5 and 85 vol %. Examples of hydrophilic hydrosilanes and reactive compounds (A) are PEGylated hydrosilanes and PEGylated reactive compounds (A).

Hydrosilane

A hydrosilane is a molecule containing at least one hydrosilyl group. A hydrosilyl group is a group containing a silicon atom and at least one hydrogen atom bound to Si. The Si—H is called a silicon hydride. When one H is bound to Si, it is a silicon monohydride. A silicon dihydride is a Si atom bound to two hydrogen atoms (Si—$H_2$), while a silicon trihydride is a Si-atom bound to three hydrogen atoms (Si—$H_3$).

The hydrosilane can have more than one hydrosilyl group, for example 2, 3, 4, or even more hydrosilyl groups, each having at least one silicon monohydride (Si—H), silicon dihydride (Si—$H_2$) or even silicon trihydride (Si—$H_3$).

Preferably the hydrosilane has one or more hydrosilyl groups, each having at least one silicon monohydride (Si—H) or silicon dihydrides (Si—$H_2$) or silicon trihydrides (Si—$H_3$). The hydrosilane should have at least two Si-hydrides. This means that the hydrosilane has at least two silicon monohydrides (Si—H) or at least one silicon dihydride (Si—$H_2$).

The hydrosilane may be represented by any of the hydrosilanes according to formula I), II) or III),

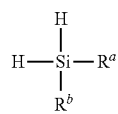

I)

II)

III)

wherein $R^c$=H or methyl,
wherein $R^a$ is H, optionally substituted $C_{1-30}$ alkyl, optionally substituted $C_{2-30}$ alkenyl, optionally substituted $C_{2-30}$ alkynyl, optionally substituted $C_{6-20}$ aralkyl, optionally substituted $C_{6-10}$ aryl, or a polymeric moiety having a molecular weight of about 1000 to about 100,000, wherein each of $R^b$ and X is, independently, optionally substituted $C_{1-30}$ alkyl, optionally substituted $C_{2-30}$ alkenyl, optionally substituted $C_{2-30}$ alkynyl, optionally substituted $C_{6-20}$ aralkyl, optionally substituted $C_{6-10}$ aryl, or a polymeric moiety having a number average molecular weight of about 1000 to about 100,000, wherein l=2-10, preferably 2-4 and k=3-6, preferably 3-4.

The polymeric moiety is selected from the group consisting of hydrocarbon polymers, polyesters, polyamides, polyethers, polyacrylates, polyurethanes, epoxides, polymethacrylates, and polysiloxanes (e.g. poly(methylhydrosiloxane)). Each of $R^a$, $R^b$, X is optionally substituted with one or more substituents selected from the group consisting of —F, —Cl, —Br, —CN, —$NO_2$, =O, —N=C=O, —N=C=S, epoxy, thiol-ether, —$N_3$, —$NR^eR^f$, —$SR^g$, —$OR^h$, —$CO_2R^i$, —$PR^jR^kR^l$, —$P(OR^m)(OR^n)(OR^p)$, —P(=O)($OR^g$)($OR^s$), —$P(=O)_2OR^t$, —OP(=O)$_2OR^t$, —S(=O)$_2R^v$, —S(=O)$R^w$, —S(=O)$_2OR^x$, and —C(=O)$NR^yR^z$. Each of $R^e$, $R^f$, $R^g$, $R^h$, $R^i$, $R^j$, $R^k$, $R^l$, $R^m$, $R^n$, $R^p$, $R^q$, $R^s$, $R^t$, $R^u$, $R^v$, $R^w$, $R^x$, $R^y$, and $R^z$, is, independently, H, $C_{1-10}$ alkyl, $C_{2-10}$ alkenyl, $C_{2-10}$ alkynyl, $C_{2-12}$ aralkyl, or $C_{6-10}$ aryl, and is optionally substituted with one or more substituents selected from the group consisting of —F, —Cl, and —Br.

Examples of hydrosilanes having a single hydrosilyl group include compounds represented by

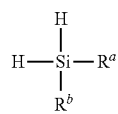

I)

where at least one of $R^a$, $R^b$, a group represented by the formula selected from the following list A of substituents 100-194 and the remaining $R^a$, $R^b$, is independently chosen from the groups as described above (e.g. $C_1$-$C_3$ alkyl), wherein the list A consists of:

100)

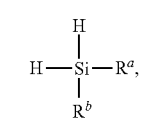

101)

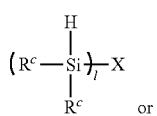

110)

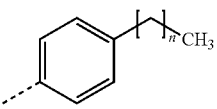

111)

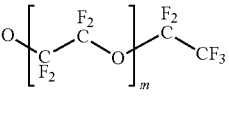

112)

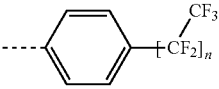

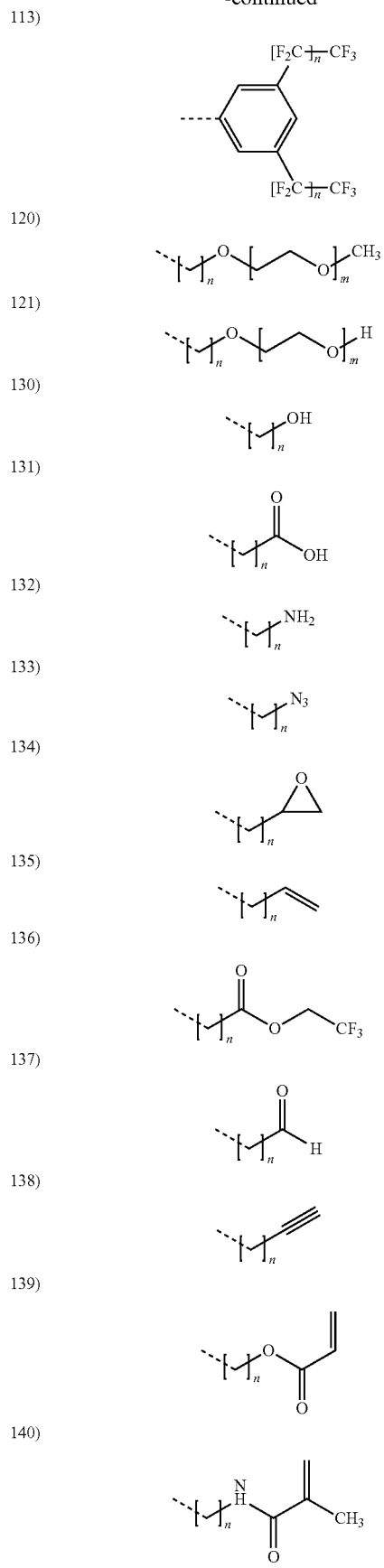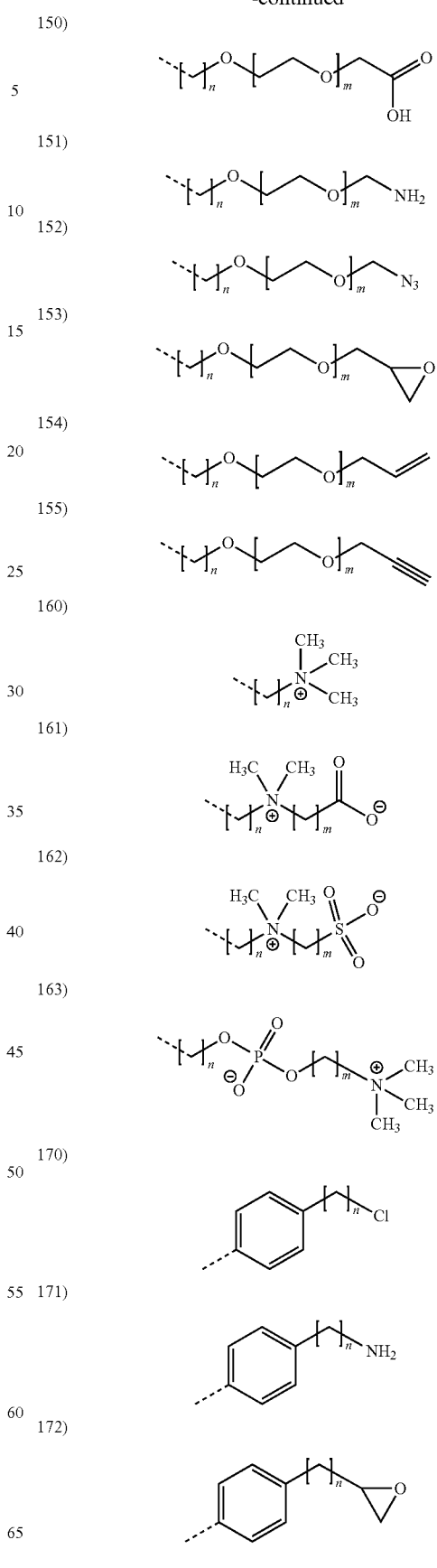

173) 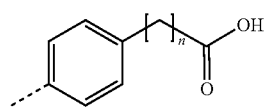
174) 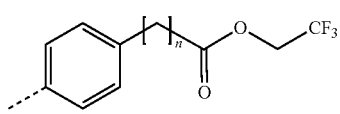
180) 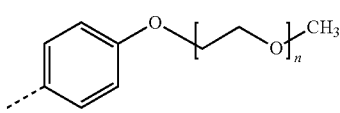
181) 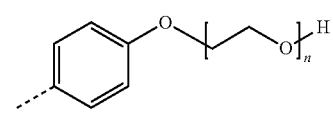
182) 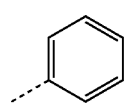
182) 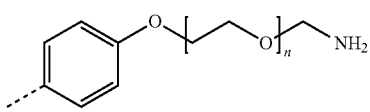
183) 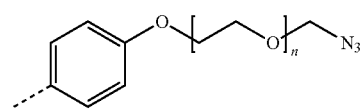
190) 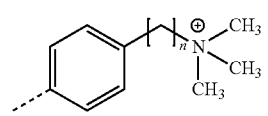
191) 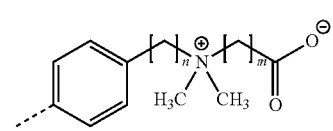
192) 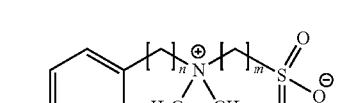
193) 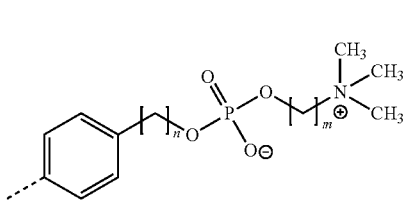
194) 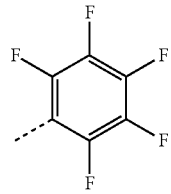
with all n = 1-20
and all m = 1-1000
For the avoidance of doubt, it is noted that substituents 100-194 of list A are bound to Si by the dashed line (- - -). Accordingly, for example, the group
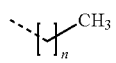
is bound to Si as Si—CH$_2$CH$_3$ when n is 1 and Si—(CH$_2$)$_5$CH$_3$ when n is 5.
Examples of hydrosilanes having at least two hydrosilyl groups are compounds with reference 200-263 below:
200) 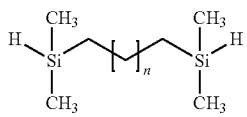
201) 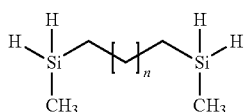
202) 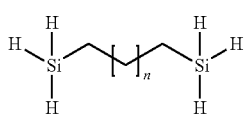
210) 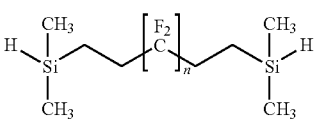
211) 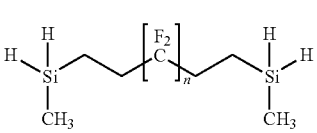
212) 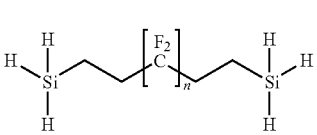
220) 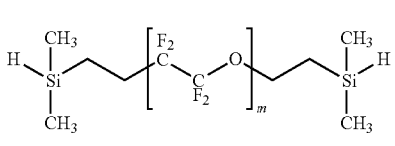

221) 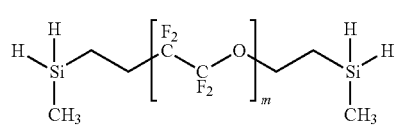
222) 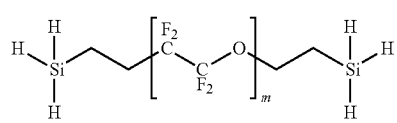
230) 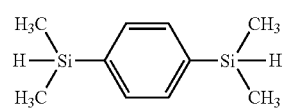
231) 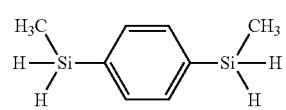
232) 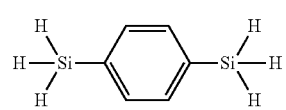
240) 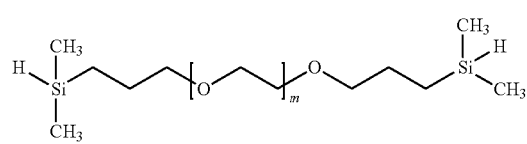
241) 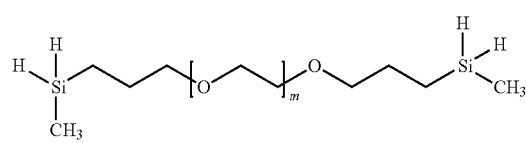
242) 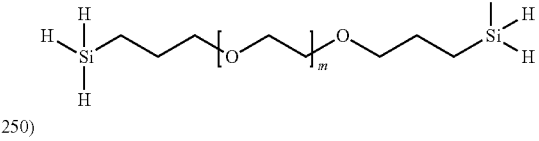
250) 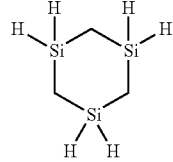
251) 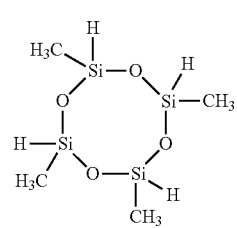
252) 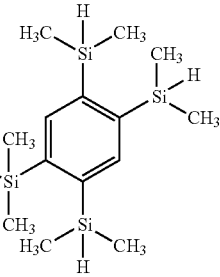
253) 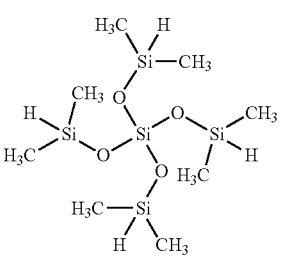
254) 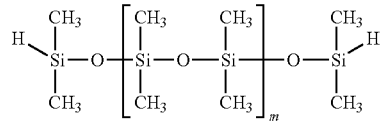
255) 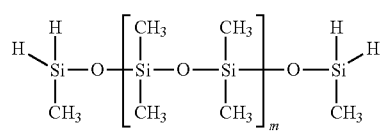
256) 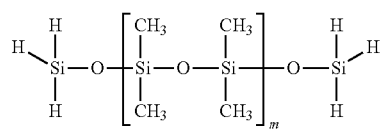
260) 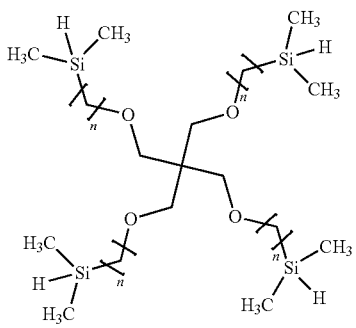

261)

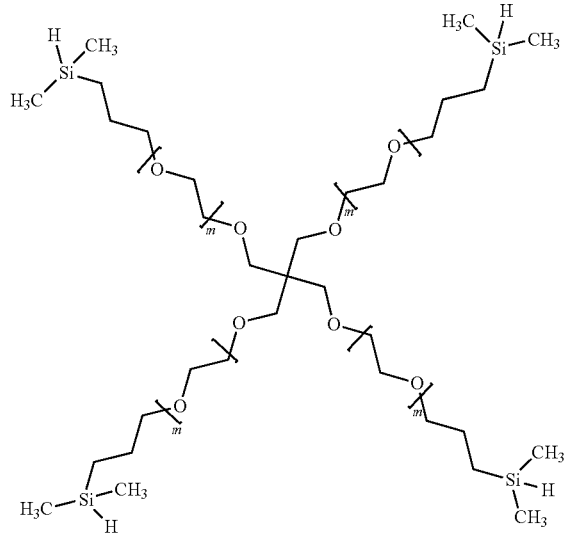

262)

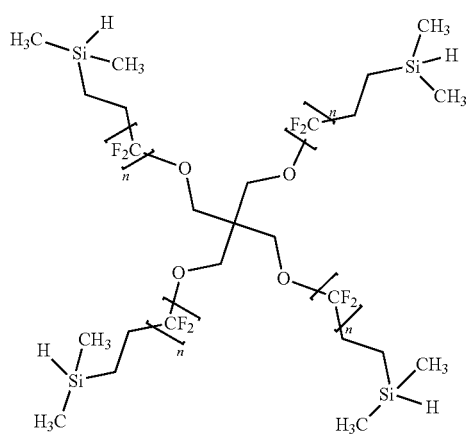

263)

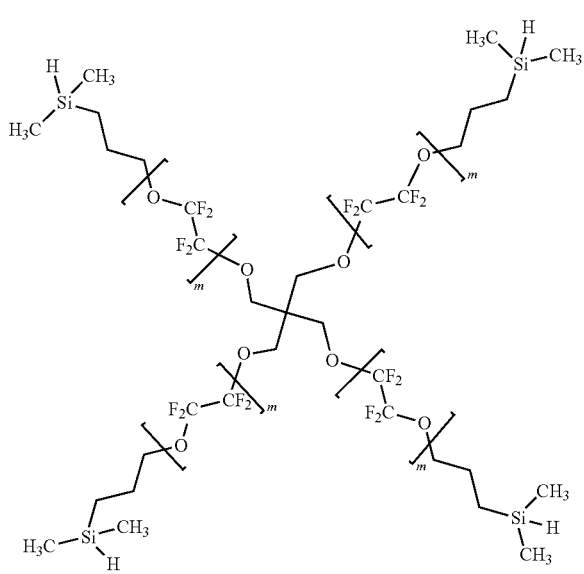

with all n = 1-20
and all m = 1-1000

In all formulas 100-263 n ranges between 1 and 20 and m ranges between 1 and 1000.

Preferably n ranges between 1 and 18, more preferably between 1 and 16 or 1 and 12

Preferably m ranges between 5 and 500, or more preferably between 10 and 400.

Reactive Compound (A)

The surface-modifying composition also comprises a reactive compound (A) other than the hydrosilane.

The reactive compound (A) comprises at least two functional groups selected from (meth)acrylate, (meth)acrylamide, hydroxyl, carboxylic acid, alkene, alkyne and epoxy.

Preferably the reactive compound (A) comprises at least one (meth)acrylate and/or one (meth)acrylamide as one type of reactive group and at least one hydroxyl, carboxylic acid, alkene, alkyne or epoxy group as second type of reactive group.

More preferably the reactive compound (A) comprises at least two hydroxyl groups or the reactive compound (A) comprises at least one (meth)acrylate and/or one (meth)acrylamide as one type of reactive group and at least one hydroxyl group as second type of reactive group. Surprisingly it is found that the formation of a surface modification layer on a substrate can be tuned when this combination of reactive groups in reactive compound (A) are present; specifically, the thickness of the surface modification layer can be increased and controlled, and/or the density and porosity of the surface modification layer can varied. Moreover the properties of the surface modification layer further improve: the hydrophobicity of the layer can further increase, or the hydrophilicity (depending on the substituents used on the reactive compound (A) and hydrosilanes), the surface modification layer may show improved antifouling behavior, the surface modification layer can be functionalized with a higher loading of for example biomolecules. Further the layers can be crosslinked and increased chemical surface coupling can be obtained, which may increase the chemical and mechanical stability of the surface modification layers.

It is possible to use mixtures of reactive compounds (A), and also to use reactive compounds (A) with other reactive compounds, for example mono-(meth)acrylates, mono-(meth)acrylamides, mono-alcohols, mono-alkenes, mono-alkynes, and the like.

Specific examples of the reactive compounds (A) are compounds according to formulas 300-375, wherein n ranges between 1 and 20 and m ranges between 1 and 1000:

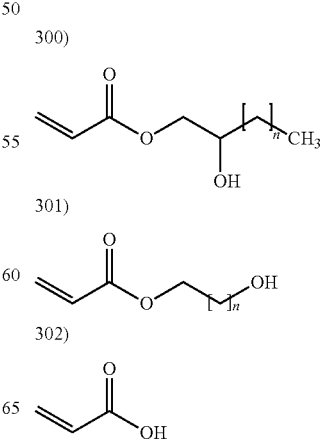

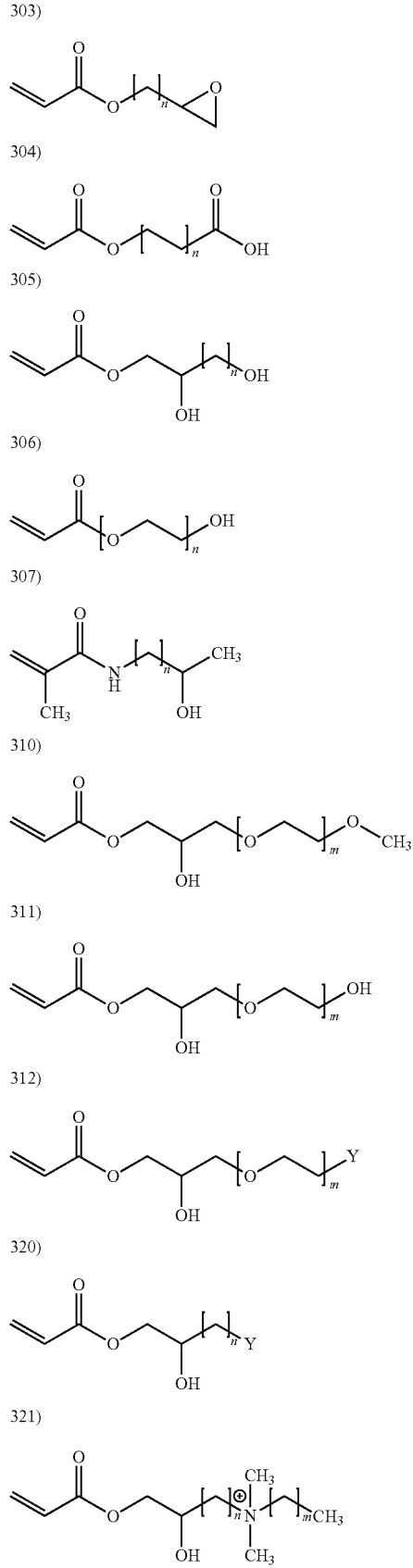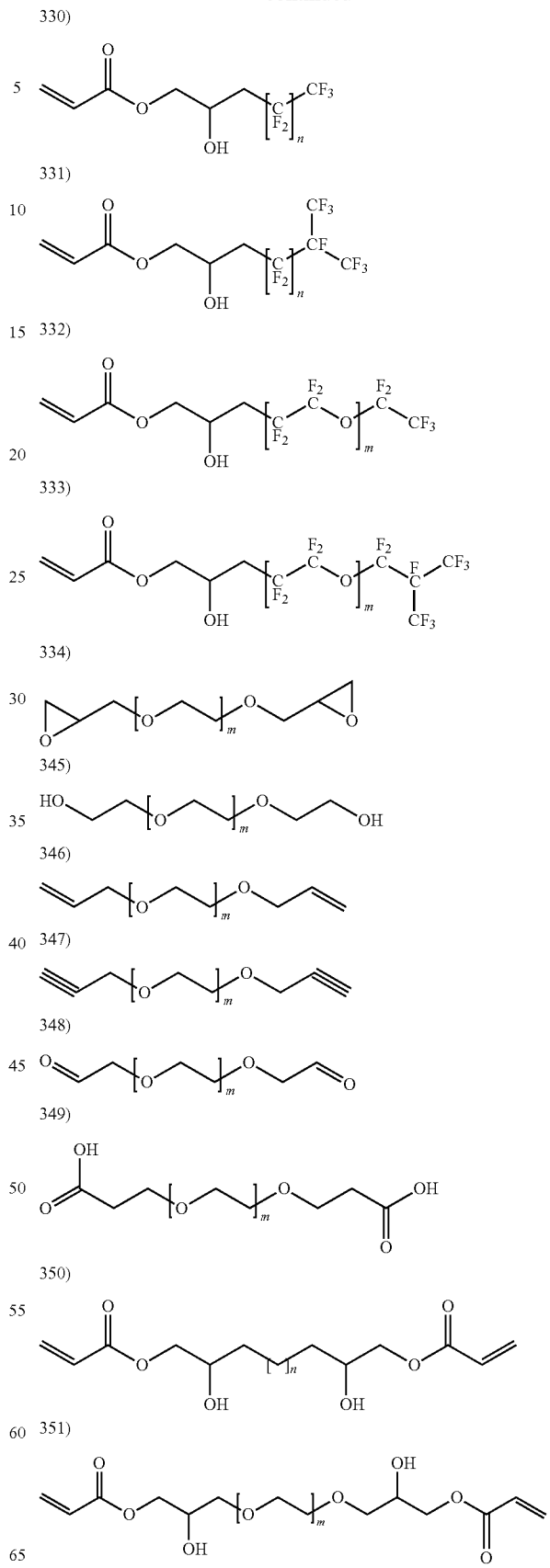

352)
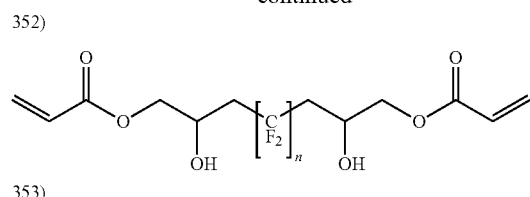
353)
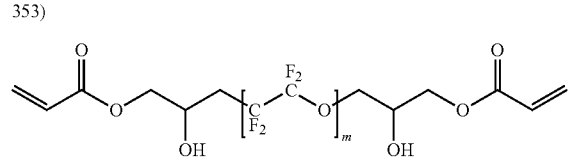
360)
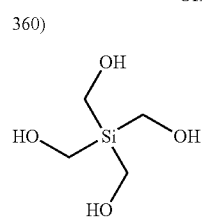
361)
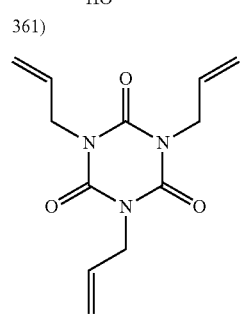
362)
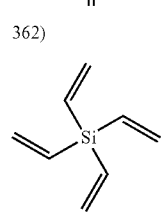
363)
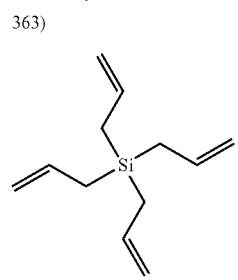
364)
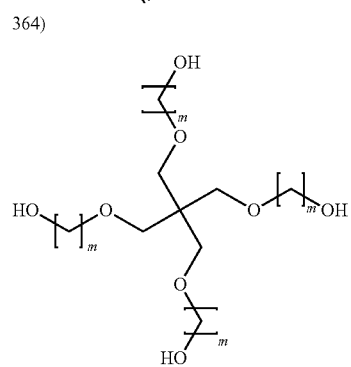
365)
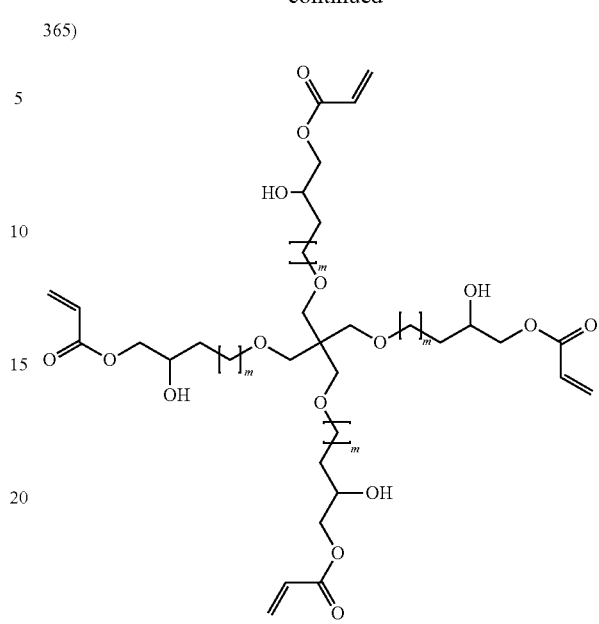
370)
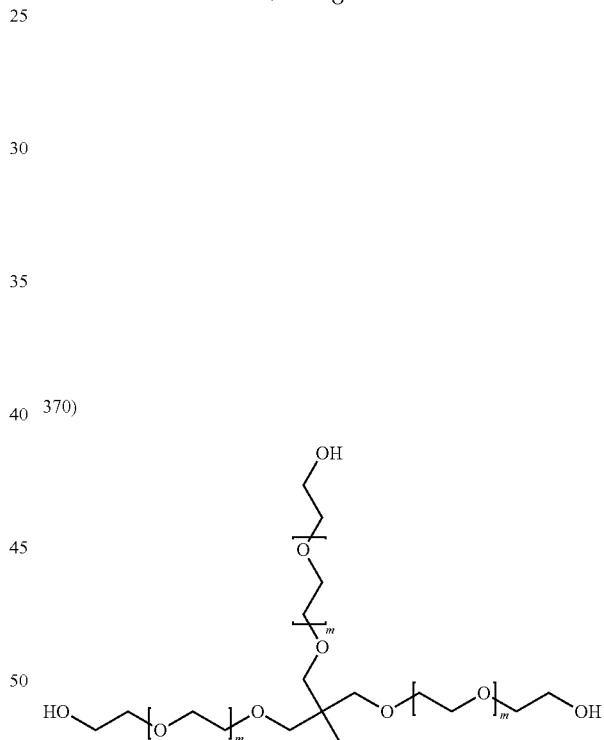

371)

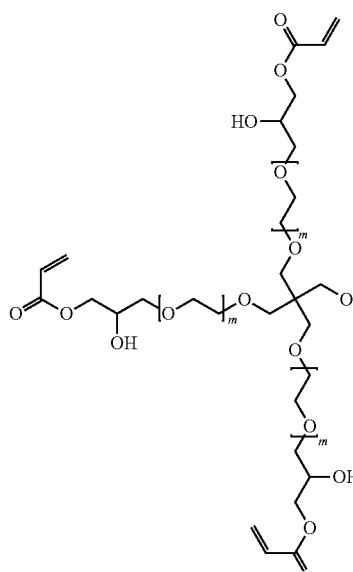

372)

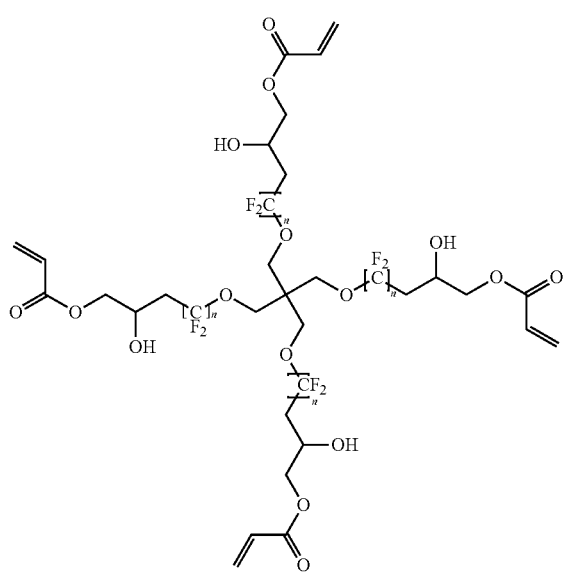

373)

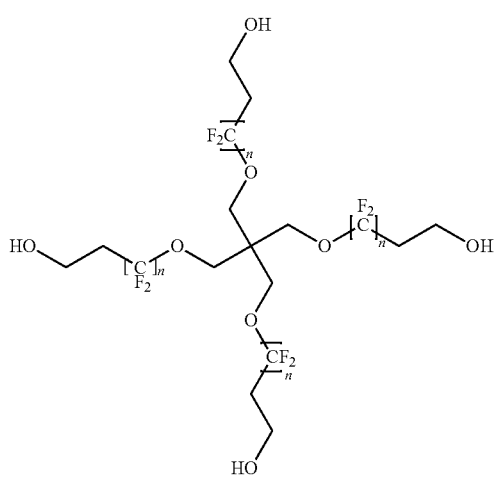

374)

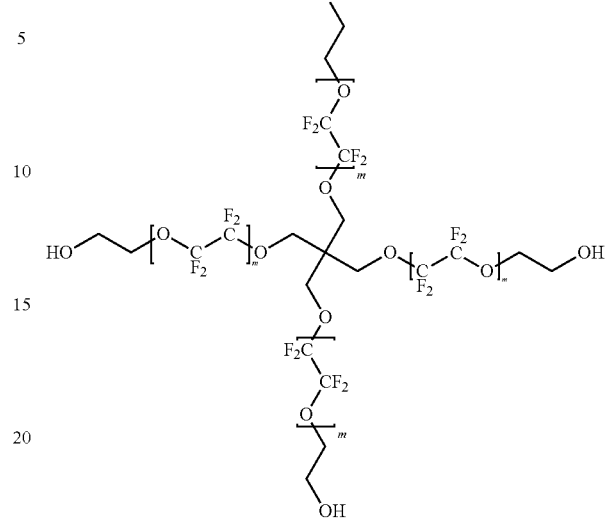

375)

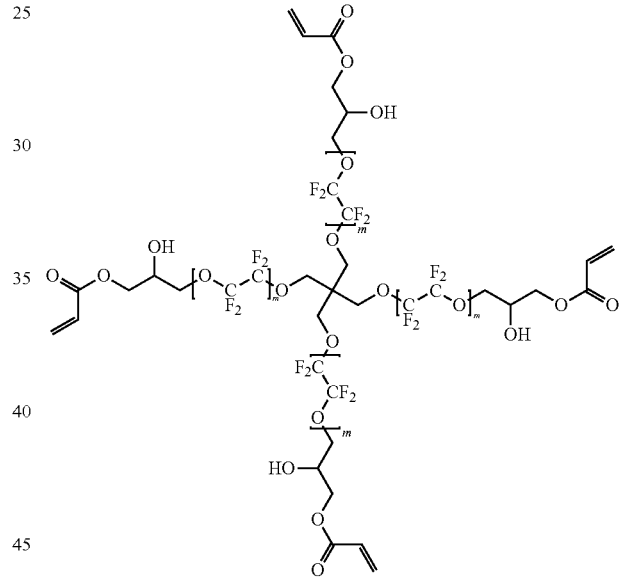

with all n = 1-20
and all m = 1-1000 with Y being azido, amine, PFP,
NHS, COOH, aldehyde, alkene,
alkyne, etc

Embodiments

In a preferred embodiment of the invention the surface-modifying composition comprises hydrosilanes and reactive compounds (A) which can be mixed well together and form a homogeneous solution.

In one embodiment the surface-modifying composition comprises a hydrosilane according to formula 100, 182, 200-202, 230-232, 250, 251 or mixtures thereof and a reactive compound (A) according to formula 300, 301, 303, 305, 350, 360-365 or mixtures thereof and optionally a photoinitiator, nanoparticles and solvent. As a solvent, for example aliphatic or chlorinated solvents could be used, more specific examples of solvents are pentane, hexane, heptane, octane, and dichloromethane and dichloroethane.

In another embodiment the surface-modifying composition comprises a hydrosilane according to anyone of formulas 120, 121, 150-155, 180, 181, 240-242, 250-253, 261 and a reactive compound (A) according to one of the formula 306, 310-312, 345, 351, 370, 371 or mixtures thereof and optionally photoinitiator, nanoparticles and solvent. As a solvent, for example polar solvents could be used, more specific examples of polar solvents are isopropyl alcohol, propanol, methanol, diethyleneglycol dimethyl ether, tetraethylene glycol dimethyl ether, acetonitrile, dimethylformamide, dimethylsulfoxide and water.

In another embodiment the surface-modifying composition comprises a hydrosilane according to anyone of formulas 110, 194, 210-212, 230-232, 250, 251, 262 and a reactive compound (A) according to one of the formula 330, 331, 352, 372, 373 or mixtures thereof and optionally photoinitiator, nanoparticles and solvent. As a solvent, for example aliphatic, chlorinated, or fluorinated solvents could be used, more specific examples of solvents are pentane, hexane, heptane, octane, and dichloromethane, dichloroethane, and trifluorotoluene, Fluorinert (e.g. FC40 and FC70), perfluorohexane and perfluorooctane.

In another embodiment the surface-modifying composition comprises a hydrosilane according to anyone of formulas 110, 111, 194, 220-222, 250, 251, 263 and a reactive compound (A) according to one of the formula 332, 333, 353, 374, 375 or mixtures thereof and optionally photoinitiator, nanoparticles and solvent. As a solvent, for example aliphatic, chlorinated, or fluorinated solvents could be used, more specific examples of solvents are pentane, hexane, heptane, octane, and dichloromethane, dichloroethane, and trifluorotoluene, Fluorinert (e.g. FC40 and FC70), perfluorohexane and perfluorooctane.

The invention also relates to a surface-modifying composition comprising a hydrosilane and a reactive compound (A) as defined above.

The invention relates to a the surface-modifying composition comprising a hydrosilane according to formula 100, 182, 200-202, 230-232, 250, 251 or mixtures thereof and a reactive compound (A) according to formula 300, 301, 303, 305, 350, 360-365 or mixtures thereof and optionally a photoinitiator, nanoparticles and solvent. As a solvent, for example aliphatic or chlorinated solvents could be used, more specific examples of solvents are pentane, hexane, heptane, octane, and dichloromethane and dichloroethane.

In another embodiment, the invention relates to a surface-modifying composition comprising a hydrosilane according to anyone of formulas 120, 121, 150-155, 180, 181, 240-242, 250-253, 261 and a reactive compound (A) according to one of the formula 306, 310-312, 345, 351, 370, 371 or mixtures thereof and optionally photoinitiator, nanoparticles and solvent. As a solvent, for example polar solvents could be used, more specific examples of solvents are isopropyl alcohol, propanol, methanol, diethyleneglycol dimethyl ether, tetraethylene glycol dimethyl ether, acetonitrile, dimethylformamide, dimethylsulfoxide and water.

In another embodiment, the invention relates to a surface-modifying composition comprising a hydrosilane according to anyone of formulas 110, 194, 210-212, 230-232, 250, 251, 262 and a reactive compound (A) according to one of the formula 330, 331, 352, 372, 373 or mixtures thereof and optionally photoinitiator, nanoparticles and solvent. As a solvent, for example aliphatic, chlorinated, or fluorinated solvents could be used, more specific examples of solvents are pentane, hexane, heptane, octane, and dichloromethane, dichloroethane, and trifluorotoluene, Fluorinert (e.g. FC40 and FC70), perfluorohexane and perfluorooctane.

In another embodiment, the invention relates to a surface-modifying composition comprising a hydrosilane according to anyone of formulas 110, 111, 194, 220-222, 250, 251, 263 and a reactive compound (A) according to one of the formula 332, 333, 353, 374, 375 or mixtures thereof and optionally photoinitiator, nanoparticles and solvent. As a solvent, for example aliphatic, chlorinated, or fluorinated solvents could be used, more specific examples of solvents are pentane, hexane, heptane, octane, and dichloromethane, dichloroethane, and trifluorotoluene, Fluorinert (e.g. FC40 and FC70), perfluorohexane and perfluorooctane.

Use of the Surface-Modifying Composition

The surface-modifying composition, comprising a hydrosilane, a reactive compound (A), and optionally one or other components, may be contacted with the surface of the solid material. The surface-modifying composition can be contacted with the solid material by different deposition methods, e.g. pipetting, dipcoating, spraycoating, or spin-coating. It is not needed to apply a primer or adhesion promotor to the surface of the solid material in order to improve adhesion.

The process according to the invention results in the formation of a surface modification layer on the surface of the solid material. The surface modification layer may have a thickness in the range of 0.1 nm to 100 μm, for example 1 nm to 10 μm, preferably at least 5 nm, more preferably between 10 nm and 1 μm or between 10 and 100 nm.

The present invention further provides the surface-modified solid material obtained by or obtainable by the process of the invention.

In one embodiment the material is surface-modified with a hydrophobic surface modification layer and has a Water Contact Angle (WCA) between 100 and 180°, preferably between 120 and 179°, or between 130 and 178°.

In another embodiment, the material is surface-modified with a hydrophilic surface modification layer and has a WCA of less than 80°, preferably less than 40°, or less than 30°, or less than 20°.

Preferably the material obtained by the process of the invention has a patterned surface, whereby part of the surface is not surface-modified and part of the surface is surface-modified by the surface modifying composition. This is achieved by irradiating only part of the surface, for example by using a photomask. No surface modification takes place on the non-irradiated part of the surface, which means that the non-irradiated surface does not contain compounds of the surface-modifying composition.

The surface-modified material comprises at least partially a layer having a thickness of preferably at least 5 nm, more preferably a thickness between 10 and 100 nm (as determined with ellipsometry).

Regarding the selectivity, the two important parameters for the patterned surfaces according to the invention are
1) (chemical) contrast—(maximum) difference in effectiveness of the surface modification reaction. For a hydrophobicity-inducing surface modification this is e.g. measured by the difference in water contact angle (WCA) between the irradiated and non-irradiated areas. For a hydrophilicity-inducing surface modification this is e.g. measured by the difference in water contact angle (WCA) between the irradiated and non-irradiated areas. For an antifouling-inducing surface modification this is e.g. measured by the difference in protein and/or cell adsorption between the irradiated and non-irradiated areas. This could for instance be done by contacting both areas with fluorescently labeling proteins and measure (after a thorough washing with buffer solution) the fluorescence intensity (of the adsorped proteins) on the irradiated and non-irradiated areas. For an bio-immobilization-inducing surface modification this is e.g. measured by the amount of biomolecules that can be immobilized between the irradiated and non-irradiated areas. This could for instance be done by using fluorescently labeled protein for bio-immobilization and measure (after thorough washing with buffer solution) the fluorescence intensity (of the immobilized proteins) on the irradiated and non-irradiated areas.

2) (lateral) resolution—distance over which the effectiveness of the surface modification changes from maximum to minimum value, i.e. 'sharpness' of the interface between irradiated and non-irradiated areas. The sharpness could for example be measured by AFM topography measurements or high resolution SEM measurements or imaging ellipsometry.

Generally, a higher number of hydrosilyl groups in the hydrosilane, a higher number of silicon hydrides in the hydrosilyl group of the hydrosilanes, a higher concentration of hydrosilanes in the surface-modifying composition, and a higher number of reactive groups in the reactive compound (A) lead to a shorter reaction time. Further the number of silicon hydrides in the hydrosilyl group of the hydrosilane influences the (chemical) contrast.

The present invention further provides an article comprising the surface-modified solid material according to the invention. Optionally, the article has micro- or nanostructures. Preferred examples of the article according to the invention include a substrate for biochip applications such as microarray applications and cell culture applications; a microfluidic device such as a lab-on-a-chip device or an organ-on-a-chip device.

It is noted that the invention relates to all possible combinations of features described herein, preferred in particular are those combinations of features that are present in the claims. It will therefore be appreciated that all combinations of features relating to the composition according to the invention; all combinations of features relating to the process according to the invention and all combinations of features relating to the composition according to the invention and features relating to the process according to the invention are described herein.

It is further noted that the term 'comprising' does not exclude the presence of other elements. However, it is also to be understood that a description on a product/composition comprising certain components also discloses a product/composition consisting of these components. The product/composition consisting of these components may be advantageous in that it offers a simpler, more economical process for the preparation of the product/composition. Similarly, it is also to be understood that a description on a process comprising certain steps also discloses a process consisting of these steps. The process consisting of these steps may be advantageous in that it offers a simpler, more economical process.

When values are mentioned for a lower limit and an upper limit for a parameter, ranges made by the combinations of the values of the lower limit and the values of the upper limit are also understood to be disclosed.

DETAILED DESCRIPTION OF THE INVENTION

Figure 1A:
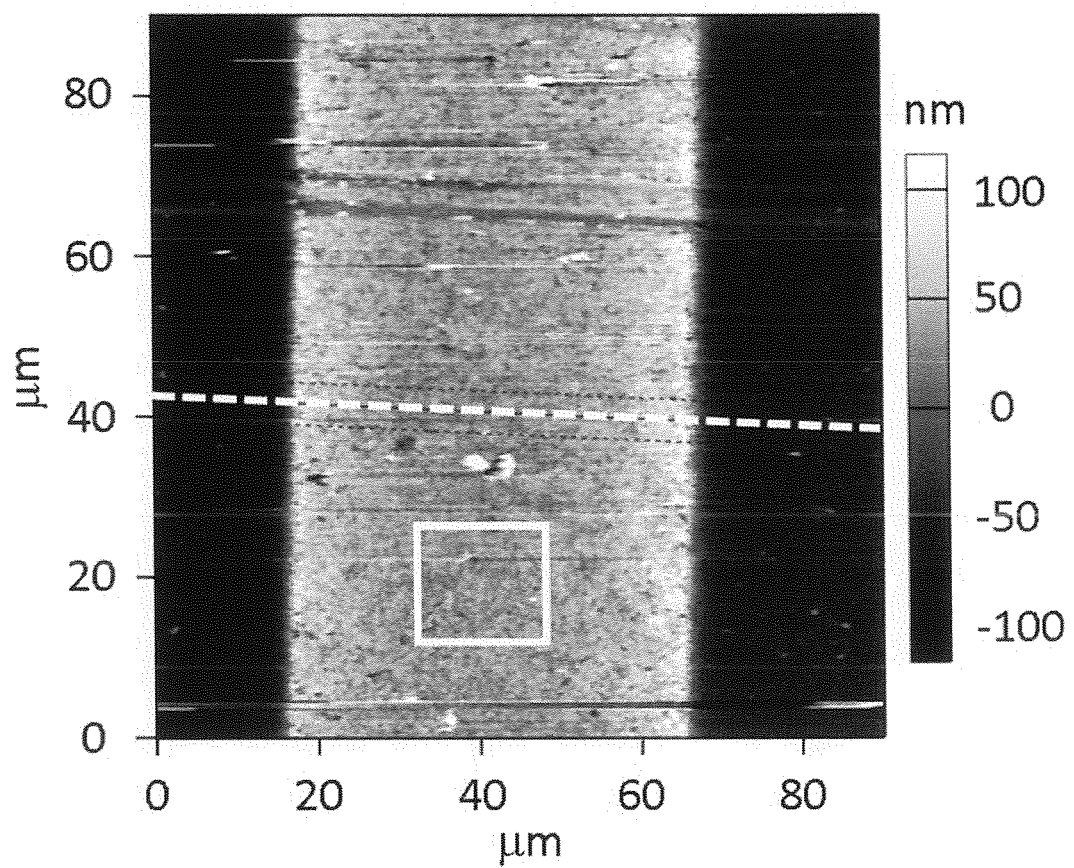
FIG. 1—AFM height image of a 50 μm wide surface modification layer line on glass (a) and the corresponding height profile (b).

The invention is now elucidated by way of the following examples, without however being limited thereto.

EXAMPLES

General
Materials

Commercially available hydrosilanes and solvents were obtained from Sigma-Aldrich or Gelest. When needed, compounds were purified using Kugelrohr vacuum distillation. Hydrosilanes that are not commercially available were synthesized by reduction of the corresponding chlorosilanes with $LiAlH_4$ using a procedure adapted from literature.

Surface Modification

Samples were cleaned by rinsing and ultrasonication in an appropriate solvent. Optionally, samples were exposed to a low pressure oxygen plasma to create hydroxyl groups and/or other oxidized species (e.g. aldehydes, ketones, carboxylic acids) on the surface. The sample was placed on a custom-made sample holder and a volume of the surface-modifying composition was deposited on the surface. Then, the sample was covered by a photomask, resulting in a uniform liquid film between the sample and the photomask. To demonstrate the principle of photochemical surface modification a very simple photomask was used with which half of the sample is irradiated, and the other half is not. Next, the sample was irradiated with UV light at an intensity of 10-15 $mW/cm^2$, using a collimated light source. After completion of the reaction samples were rinsed to remove the excess of the surface-modifying composition and ultrasonicated with a suitable solvent. Finally, samples were dried in a stream of nitrogen.

Surface Characterization

Samples were analyzed by static water contact angle (WCA) measurements using a Krüss DSA-100 goniometer. Using the automated dispensing unit, 3 μL water droplets were deposited on the surface, images were captured using a digital camera and analyzed using a suitable fitting algorithm, depending on the wettability of the surface.

The thickness of the surface modification layer was determined by spectroscopic imaging ellipsometry, using an EP4 ellipsometer (Accurion GmbH). The ellipsometric parameters Δ and ψ were determined in the spectral range between 400 and 900 nm at an angle of incidence of 50°. For calculation of the layer thickness, an optical model of the sample needs to be created and fitted to the experimental data. A three-layer model was used, consisting of (1) the substrate, (2) the surface modification layer and (3) air (ambient). The optical properties of the substrate were determined experimentally by measuring Δ and ψ for a non-modified substrate. The Cauchy model is commonly used in ellipsometry for modelling thin non-absorbing organic films. In this model, the wavelength-dependent refractive index n(λ) of the layer is given by:

$$n(\lambda) = A_n + \frac{B_n}{\lambda^2}$$

In some cases, the simple Cauchy model gave good fit results with $A_n=1.50\pm0.05$ and $B_n$ between $10^3$ and $10^4$ nm$^2$. For other samples, good fit results were only obtained when the surface modification layer was modelled using a model for porous materials (Bruggeman effective medium approximation) allowing for the presence of a fraction of air of $50\pm10\%$ in the Cauchy layer.

Molecular Structures and Abbreviations

Substrates

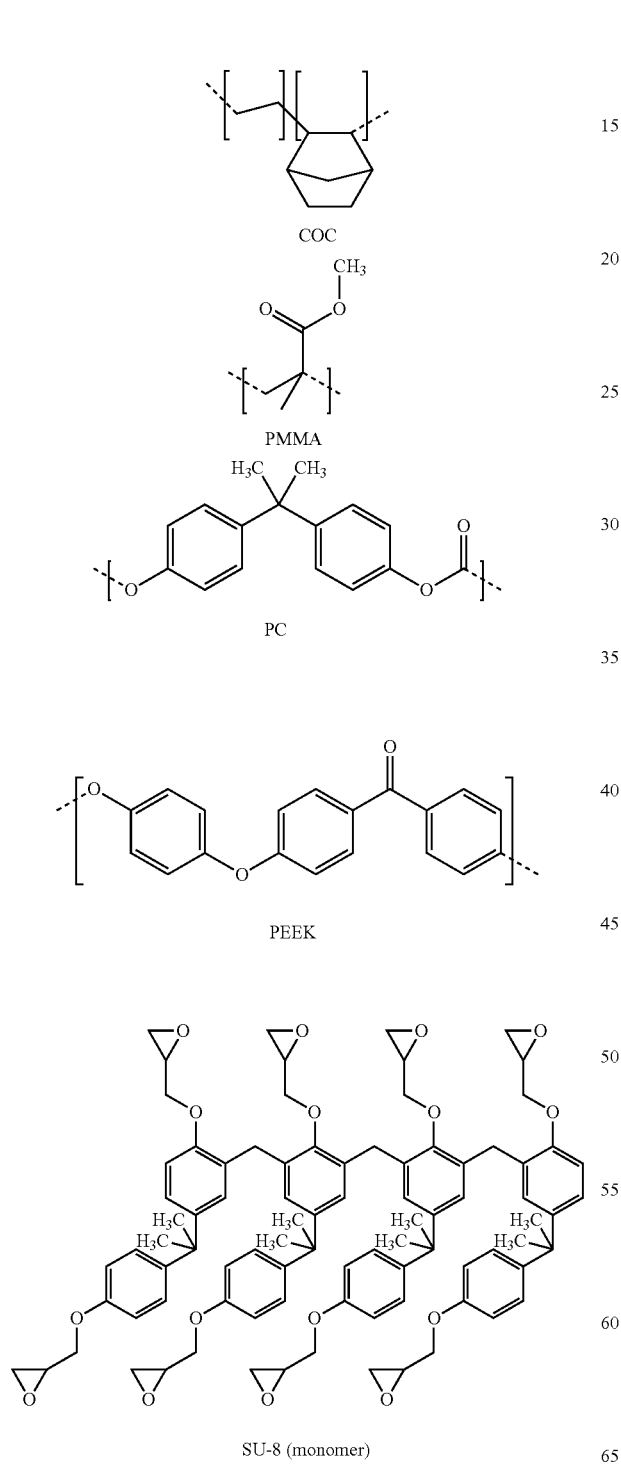

PMMA

PC

PEEK

SU-8 (monomer)

-continued

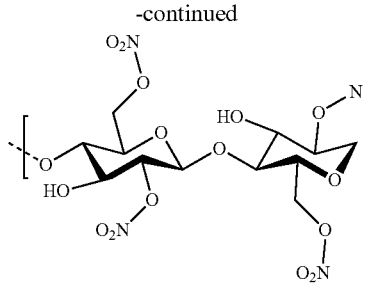

nitrocellulose

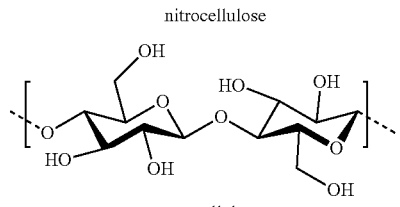

cellulose

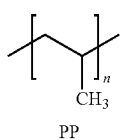

PP

Hydrosilanes

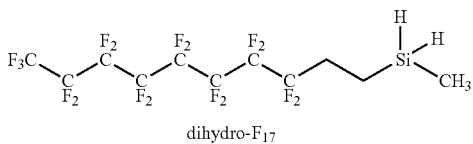

dihydro-F$_{17}$

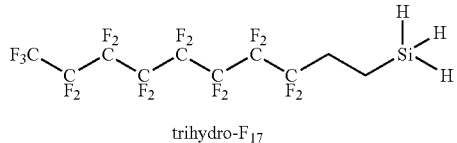

trihydro-F$_{17}$

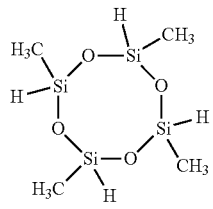

TMCTS

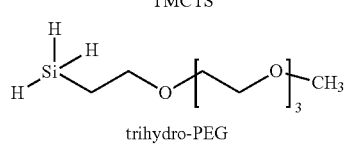

trihydro-PEG dihydro-PEG

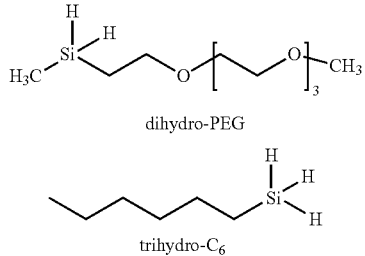

trihydro-C$_6$

29
-continued

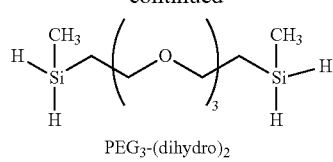
PEG₃-(dihydro)₂

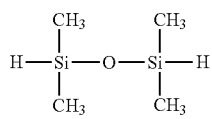
trimethoxysilane

H—Si—O—Si—H (CH₃, CH₃, CH₃, CH₃, H)
TMDS

Reactive Compound (A)s

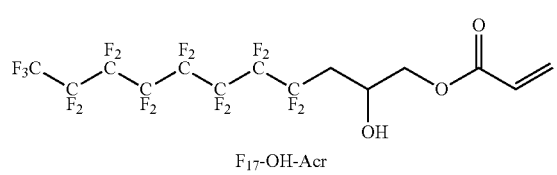
F₁₇-OH-Acr

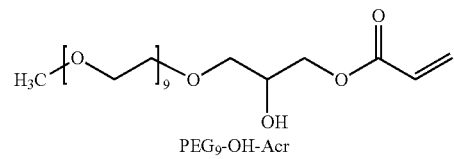
PEG₉-OH-Acr

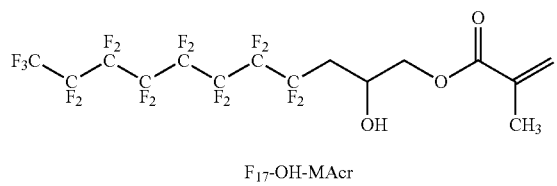
F₁₇-OH-MAcr

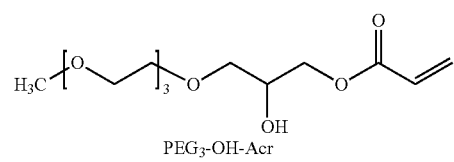
PEG₃-OH-Acr

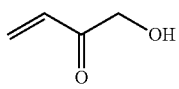
acrylic acid

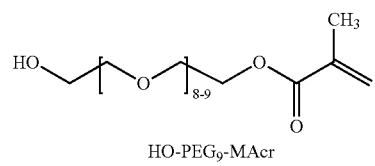
HO-PEG₉-MAcr

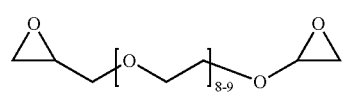
PEG-diepoxide

30
-continued

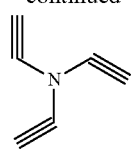
amino trialkyne

Solvents and Other Components

DGDE (solvent)

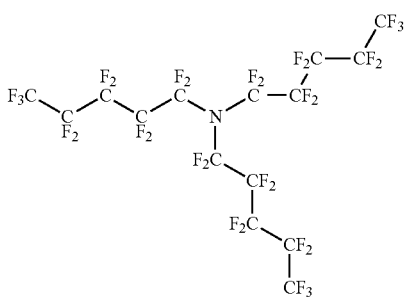
FC70 (solvent)

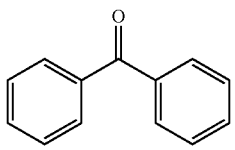
BP (photoinitiator)

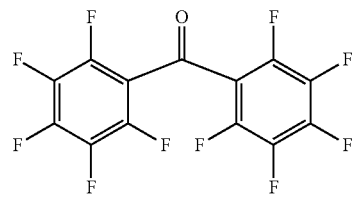
BP-F₁₀ (photoinitiator)

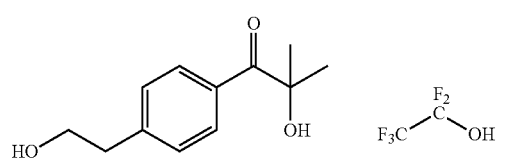

HMP (photoinitiator)     F₅—EtOH (solvent)

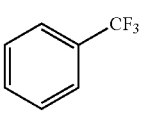   

TFT (solvent)            DMP (solvent)

-continued
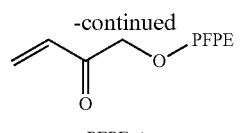
PFPE-Acr
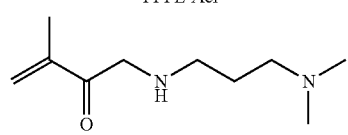
DMA-MACrAm

| Experiment # | Substrate | plasma oxidation | hydrosilane type | conc[1] | reactive compound (A) type | conc[1] | other component type | conc[2] | solvent type | conc[1] | UV time min | WCA (°) non-treated | WCA (°) irradiated | WCA (°) non-irradiated |
|---|---|---|---|---|---|---|---|---|---|---|---|---|---|---|
| 1a | glass | yes | dihydro-$F_{17}$ | 99 | $F_{17}$—OH-Acr | 1 | — | — | — | — | 15 | | 121 | 30 |
| 1b | glass | yes | dihydro-$F_{17}$ | 95 | $F_{17}$—OH-Acr | 5 | — | — | — | — | 15 | | 142 | 24 |
| 1c | glass | yes | dihydro-$F_{17}$ | 90 | $F_{17}$—OH-Acr | 10 | — | — | — | — | 15 | | 142 | 30 |
| 1d | glass | yes | dihydro-$F_{17}$ | 80 | $F_{17}$—OH-Acr | 20 | — | — | — | — | 15 | | 135 | 45 |
| 1e (control)[3] | glass | yes | dihydro-$F_{17}$ | 100 | — | — | — | — | — | — | 15 | | 108 | 20 |
| 1f (control)[3] | glass | yes | — | — | $F_{17}$-Acr | 10 | — | — | — | — | 15 | | 114 | 20 |
| 1g (control) | glass | yes | dihydro-$F_{17}$ | 90 | $F_{17}$—OH-MAcr | 10 | — | — | — | — | 15 | | 35 | 30 |
| 2 | glass | yes | dihydro-$F_{17}$ | 90 | $F_{17}$—OH-Acr | 10 | BP | 1 | FC70 | 90 | 15 | | 131 | 33 |
| 3a | glass | yes | dihydro-$F_{17}$ | 89 | $F_{17}$—OH-Acr | 10 | BP | 1 | — | — | 5 | | 140 | 32 |
| 3b (control) | glass | yes | — | — | $F_{17}$—OH-Acr | 10 | BP | 1 | FC70 | 89 | 15 | | 38 | 30 |
| 4 | glass | yes | trihydro-PEG | 45 | $PEG_9$—OH-Acr | 5 | — | — | DGDE | 50 | 15 | | 44 | 31 |
| 5 | glass | yes | TMCTS | 8 | $PEG_9$—OH-Acr | 8 | — | — | DGDE | 84 | 15 | | 38 | 25 |
| 6 | $Si/SiO_2$ | yes | dihydro-$F_{17}$ | 89 | $F_{17}$—OH-Acr | 10 | — | — | — | — | 15 | | 132 | 75 |
| 7 | epoxide | no | dihydro-$F_{17}$ | 90 | $F_{17}$—OH-Acr | 10 | — | — | — | — | 15 | | 140 | 55 |
| 8 | SU-8 | yes | dihydro-$F_{17}$ | 99 | $F_{17}$—OH-Acr | 1 | — | — | — | — | 5 | | 130 | 65 |
| 9a | COC | yes | trihydro-$F_{17}$ | 97.5 | $F_{17}$—OH-Acr | 2.5 | — | — | — | — | 30 | | 107 | 59 |
| 9b | COC | yes | trihydro-$F_{17}$ | 95 | $F_{17}$—OH-Acr | 5 | — | — | — | — | 30 | | 105 | 62 |
| 9c | COC | yes | trihydro-$F_{17}$ | 92.5 | $F_{17}$—OH-Acr | 7.5 | — | — | — | — | 30 | | 110 | 66 |
| 9d | COC | yes | trihydro-$F_{17}$ | 90 | $F_{17}$—OH-Acr | 10 | — | — | — | — | 30 | | 115 | 65 |
| 10a | COC | yes | trihydro-PEG | 45 | $PEG_9$—OH-Acr | 45 | — | — | DGDE | 10 | 30 | | 44 | 66 |
| 10b | COC | yes | dihydro-PEG | 45 | $PEG_3$—OH-Acr | 45 | — | — | DGDE | 10 | 30 | | 37 | 66 |
| 11a | PC | no | dihydro-$F_{17}$ | 90 | $F_{17}$—OH-Acr | 10 | — | — | — | — | 30 | 78 | 135 | |
| 11b (control) | PC | no | — | — | $F_{17}$-Acr | 10 | — | — | FC70 | 90 | 30 | 78 | 77 | |
| 11c (control) | PC | no | dihydro-$F_{17}$ | 90 | — | — | — | — | — | — | 30 | 79 | 84 | |
| 12 | PMMA | no | dihydro-$F_{17}$ | 90 | $F_{17}$—OH-Acr | 10 | — | — | — | — | 30 | 75 (lit.) | 135 | |
| 13 | PEEK | no | trihydro-$F_{17}$ | 95 | $F_{17}$—OH-Acr | 5 | — | — | — | — | 15 | 70 (lit.) | 130 | |
| 14 | cellulose | no | dihydro-$F_{17}$ | 90 | $F_{17}$—OH-Acr | 10 | — | — | — | — | 15 | <10 | 140 | |
| 15a | nitrocellulose | no | dihydro-$F_{17}$ | 89 | $F_{17}$—OH-Acr | 10 | BP—$F_{10}$ | 1 | — | — | 45 | | 135 | <10 |
| 15b | nitrocellulose | no | dihydro-$F_{17}$ | 90 | $F_{17}$—OH-Acr | 10 | BP—$F_{10}$ | 1 | — | — | <1 | | 132 | <10 |
| 15c (control) | nitrocellulose | no | — | — | $F_{17}$—OH-Acr | 10 | — | — | FC70 | 89 | <1 | | <10 | <10 |

| example # | substrate | plasma oxidation | hydrosilane type | conc (vol %) | reactive compound (A) type | conc (vol %) | other component type | conc | solvent type | conc vol (%) | UV time min | thickness (nm) ellipsometry | WCA (°) irradiated | WCA (°) non-irradiated |
|---|---|---|---|---|---|---|---|---|---|---|---|---|---|---|
| 16 | glass | yes | trihydro-$F_{17}$ | 45 | $F_{17}$—OH-Acr | 5 | PFPE-Acr | 25 mg/ml | TFT(aq) | 50 | 10 | | 110 | 43 |
| 17 | glass | yes | trihydro-$F_{17}$ | 45 | $F_{17}$—OH-Acr | 5 | PFPE-Acr | 25 mg/ml | TFT | 50 | 10 | | 125 | 50 |
| 18 | glass | yes | trihydro-$F_{17}$ | 45 | $F_{17}$—OH-Acr | 5 | PFPE-Acr | 25 mg/ml | DMP | 50 | 10 | | 140 | 62 |
| 19 | glass | yes | trihydro-$F_{17}$ | 45 | $F_{17}$—OH-Acr | 5 | PFPE-Acr | 25 mg/ml | DGDE | 50 | 10 | | 133 | 50 |
| 20 | glass | yes | trihydro-$C_6$ | 23 | $F_{17}$—OH-Acr | 5 | — | — | DMP | 72 | 15 | 51 | 139 | |
| 21 | glass | yes | TMDS | 26 | $F_{17}$—OH-Acr | 5 | — | — | DMP | 69 | 15 | 68 | 142 | |
| 22 | glass | yes | trimethoxysilane | 18 | $F_{17}$—OH-Acr | 5 | — | — | DMP | 77 | 15 | 51 | 132 | |
| 23 | glass | yes | $PEG_3$-(dihydro)$_2$ | 48 | $F_{17}$—OH-Acr | 5 | — | — | DMP | 47 | 15 | 23 | 130 | |
| 24 | glass | yes | TMCTS | 10 | $F_{17}$—OH-Acr | 10 | PFPE-Acr | 25 mg/ml | TFT(aq) | 80 | 15 | | 124 | 35 |
| 25 | glass | yes | TMCTS | 10 | $F_{17}$—OH-Acr | 1 | PFPE-Acr | 25 mg/ml | TFT(aq) | 89 | 15 | | 80 | 40 |

-continued

| | | | | | | | | | | | | |
|---|---|---|---|---|---|---|---|---|---|---|---|---|
| 26 | glass | yes | TMCTS | 24 | HO-PEG$_2$-MAcr | 9 | — | — | DGDE | 67 | 15 | 13 | 70 | 56 |
| 27 | glass | yes | PEG$_3$-(dihydro)$_2$ | 48 | HO-PEG$_3$-MAcr | 7 | — | — | DGDE | 45 | 15 | 7 | 54 | |
| 28 | glass | yes | PEG$_3$-(dihydro)$_2$ | 48 | HO-PEG$_9$-MAcr | 7 | — | — | F$_5$—EtOH | 45 | 15 | 80 | 64 | |
| 29 | COC | yes | TMCTS | 5 | acrylic acid | 22.5 | DMA-MAcrAm | 22.5 vol % | DGDE | 50 | 5 | | 17 | 47 |
| 30 | PP | yes | TMCTS | 5 | acrylic acid | 22.5 | DMA-MAcrAm | 22.5 vol % | DGDE | 50 | 30 | | 38 | 95 |
| 31 | COC | yes | TMCTS | 5 | PEG-diepoxide | 18 | HMP | 1 wt % | DGDE | 77 | 30 | 17 | 62 | 48 |
| 32 | quartz | no | TMCTS | 40 | amino trialkyne | 40 | | | TFT | 20 | | | 86 | 64 |

$^1$concentrations are in vol %
$^2$concentration are in wt %

Examples 1-3: Hydrophobic Surface Modification of Glass

Glass microscope slides were cleaned by ultrasonication in acetone and isopropanol and activated by piranha solution and plasma oxidation to increase the number of silanol groups at the surface. Surface modification was carried out according to the general procedure as described above, using different concentrations and ratios of dihydro-$F_{17}$ as the hydrosilane and $F_{17}$—OH-Acr as the reactive compound (A).

In examples 1a-d, it is shown that for various compositions, 15 minutes UV irradiation is sufficient to drastically increase the hydrophobicity of the surface (WCA>120° for all compositions, >130° for concentrations $F_{17}$—OH-Acr above 1%), while the non-irradiated part of the sample remains hydrophilic (WCA approximately 30°).

In Example 1e-f are similar to or based on the invention disclosed in PCT/EP2017/069608. In example 1e, it is shown that with pure dihydro-$F_{17}$, i.e. without addition of a reactive compound (A) or photoinitiator, 15 minutes UV irradiation leads to a hydrophobic surface having a WCA of 108°, while the non-irradiated part of the sample remains hydrophilic. Example 1f is similar to example 1c, the only difference being the use of mono-reactive $F_{17}$-Acr instead of the multi-reactive $F_{17}$—OH-Acr. This clearly demonstrates the surprisingly different surface modification result. With $F_{17}$-Acr (example 1f) a WCA of 114° was obtained, while with $F_{17}$—OH-Acr a much higher WCA of 142° was obtained, while for both the non-irradiated surface remains hydrophilic.

In example 1g, it is shown that the presence of a hydrosilane is required for the surface modification to take place. If the hydrosilane (in this case dihydro-$F_{17}$) is replaced by the inert fluorinated solvent FC-70, no significant surface modification takes place and the surface remains hydrophilic (WCA of <35°) on the entire substrate.

In example 2, it is shown that instead of $F_{17}$—OH-Acr, the corresponding methacrylate $F_{17}$—OH-MAcr may also be used without a significant change of the result.

In example 3a, it is shown that additional components may be added to the surface-modifying composition. In this case, 1 wt. % of a photoinitiator is added to the composition and the irradiation time is decreased to 5 minutes. Also this composition leads to a highly hydrophobic surface on the irradiated part of the sample, while the non-irradiated part remains hydrophilic.

In example 3b, it is shown that the presence of a hydrosilane is required for the surface modification to take place, even when 1 wt. % of photoinitiator is present. If the hydrosilane (in this case dihydro-$F_{17}$) is replaced by the inert fluorinated solvent FC-70 with 1 vol % photoinitiator no significant surface modification takes place and the surface remains hydrophilic (WCA of <38°) on the entire substrate.

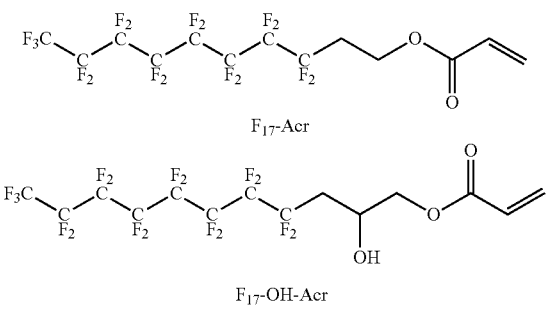

$F_{17}$-Acr $F_{17}$-OH-Acr

Also, surface modification with dihydro-$F_{17}$ and $F_{17}$-Acr according to PCT/EP2017/069608 leads to a very thin hydrophobic layer (<5 nm based on XPS data). In contrast, surface modification with dihydro-$F_{17}$ and $F_{17}$—OH-Acr according to the current invention leads to a much thicker hydrophobic layer with a high degree of surface roughness and porosity. This was shown by further analysis of the samples by AFM, SEM and ellipsometry. For these experiments, a photomask with a line pattern was used for surface modification, resulting in parallel surface modification layer lines with a width of 50 μm, separated by a distance of 100 μm.

Figure 1B:
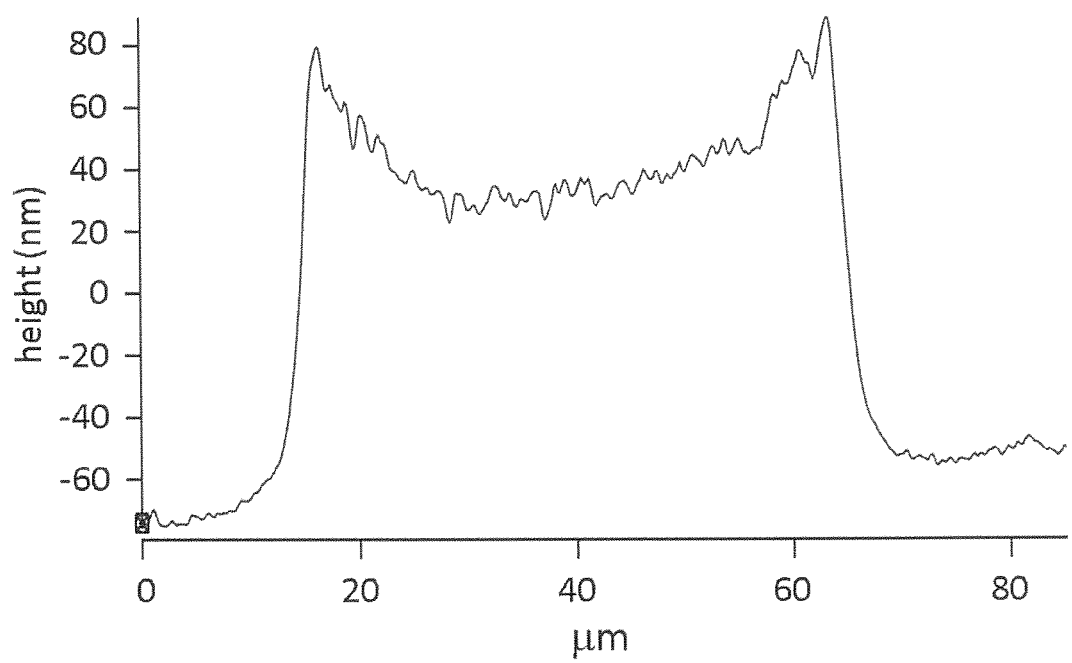

FIG. 1a shows the topography image of a surface modification layer line (width 50 μm) as measured by AFM. This image shows that the width of the surface modification layer line corresponds well with the width of the irradiated area according to the design of the photomask, showing that patterned surface modification can be achieved with a good spatial resolution by the process according to the invention. FIG. 1b shows the height profile measured along the dashed line indicated in FIG. 1a. This profile shows that the thickness of the surface modification layer is approximately 90 nm, measured in the centre of the line. Near the edges of the line, the surface modification layer is thicker by 20-30 nm. Also, the profile indicates that the surface of the modification layer is not smooth, but contains a significant amount of roughness. For the area indicated by the rectangle in FIG. 1a, a surface roughness ($R^a$) of 11 nm was calculated.

Figure 2A:
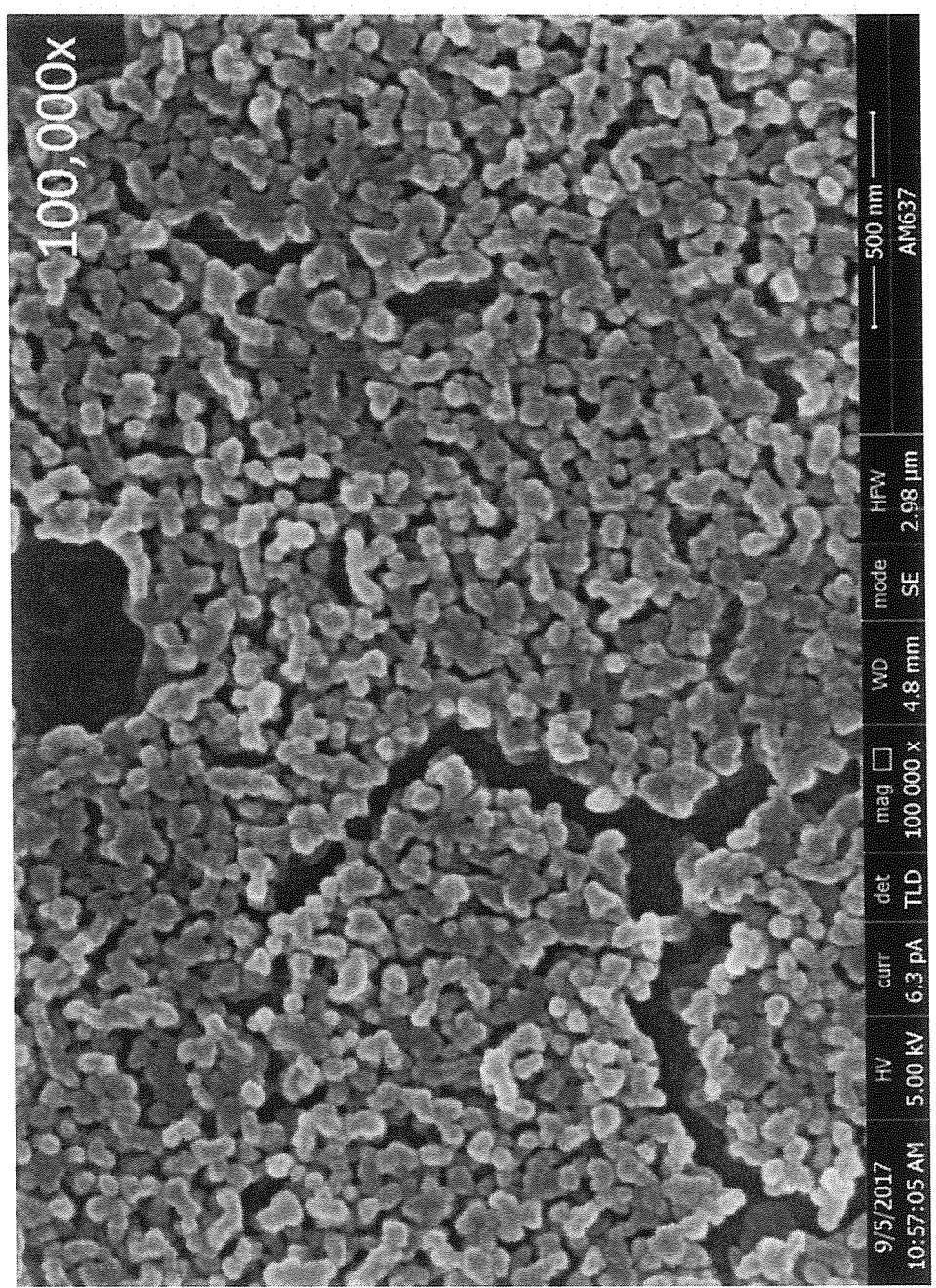
FIG. 2—SEM images of a 50 μm wide surface modification layer line on glass at a magnification of 2.500× (a) and 100,000× (b).
Figure 2B:
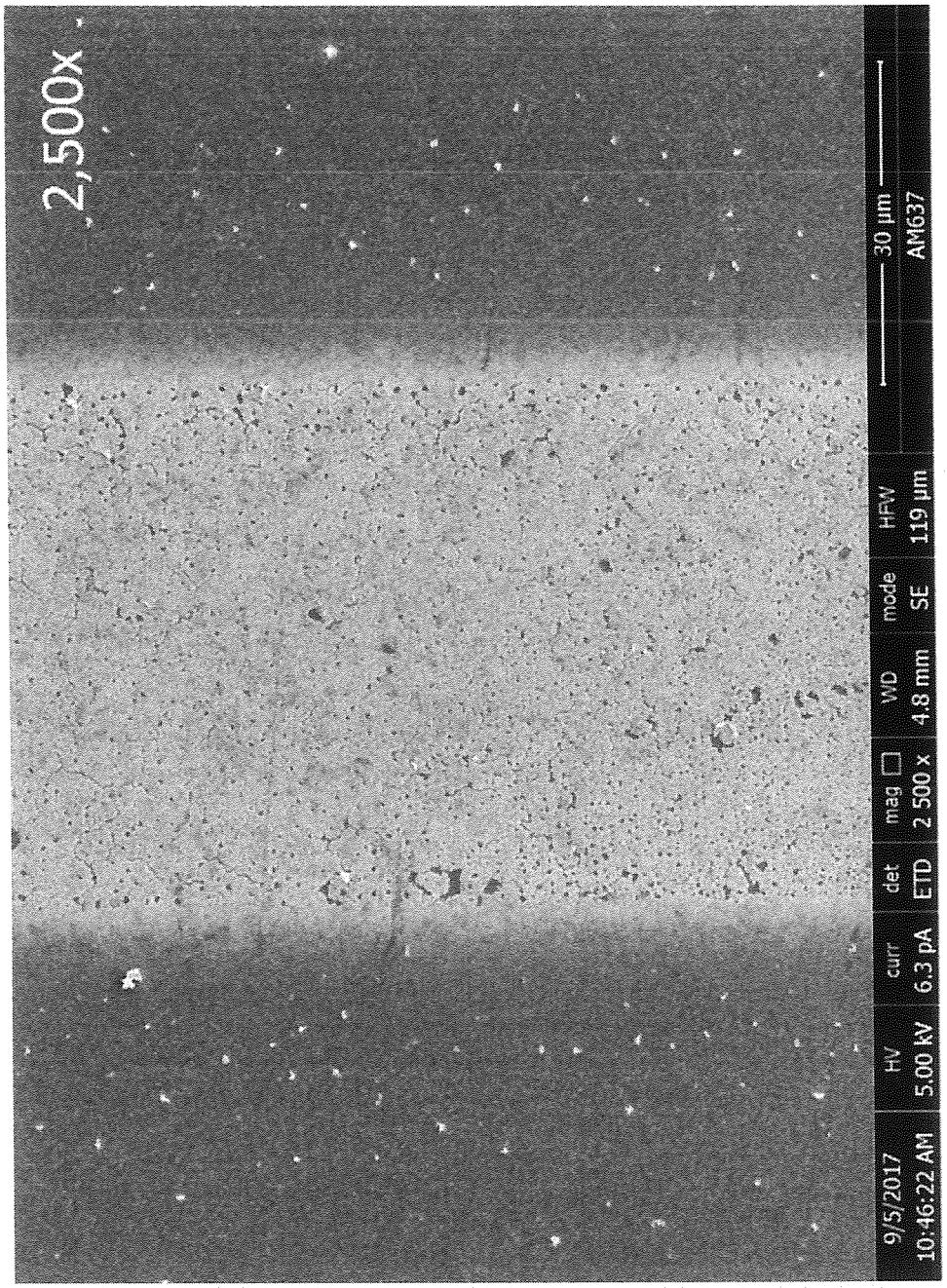

To avoid charging issues during SEM imaging, a thin layer of Tungsten was deposited on the samples by sputtering. FIG. 2a shows a SEM image of a surface modification layer line (width 50 μm) at a magnification of 2,500×. This image confirms the formation of a patterned surface modification layer with a good spatial resolution by the process according to the invention, in good agreement with the AFM image shown in FIG. 1a. Furthermore, the image indicates that on a microscopic level the surface modification layer is not homogeneous and dense, but it contains a microstructure. This is more clearly visible in FIG. 2b, which shows a smaller area of the same line at a magnification of 100,000×. This image clearly shows that there is a high degree of surface roughness and porosity, in agreement with the AFM results.

Figure 3A:
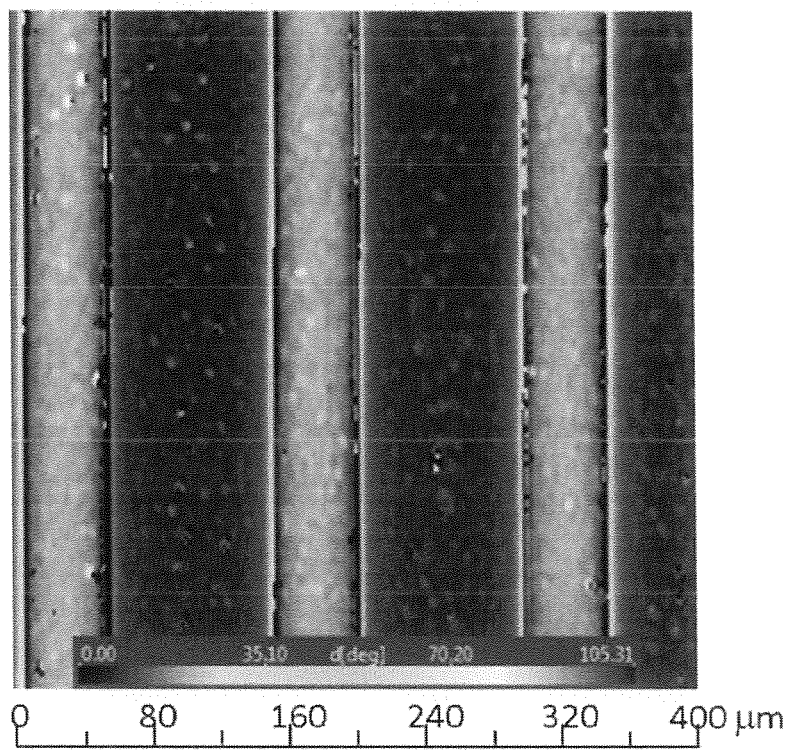
FIG. 3—ellipsometric height image of 50 μm wide surface modification layer lines on glass (a) and the corresponding height profile (b).
Figure 3B:
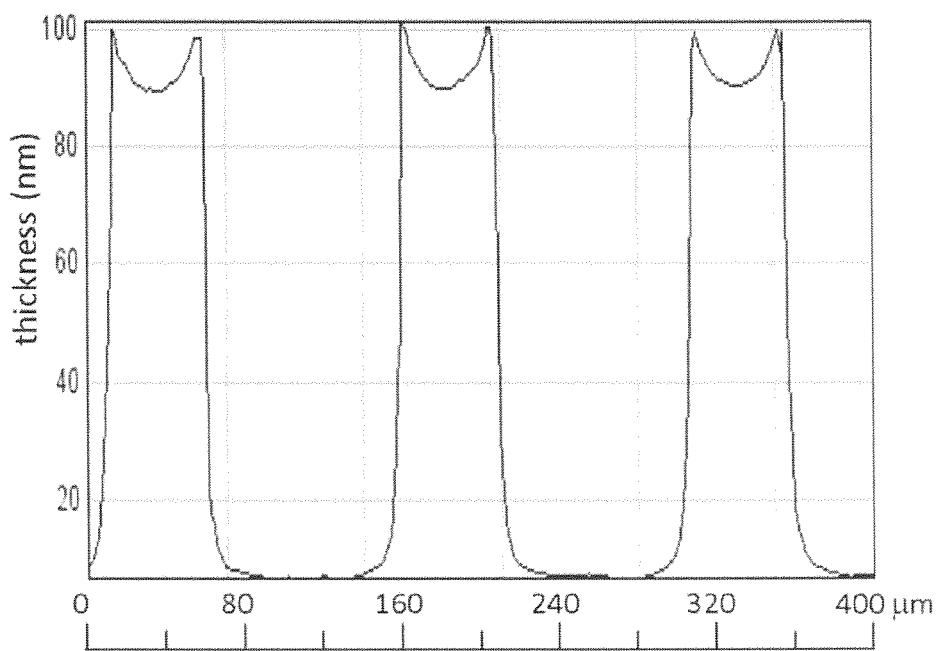

Samples were also investigated by spectroscopic imaging ellipsometry. FIG. 3a shows an ellipsometric height image of three 50 μm wide lines. FIG. 3b shows the corresponding height profile. Again, the result confirms the formation of a patterned surface modification with a good spatial resolution.

The height profile shown in FIG. 3b shows that the thickness of the layer is approximately 85 nm, measured in the centre of the line. Near the edges of the line, the surface modification layer is thicker by approximately 10 nm. When comparing the height profiles obtained by AFM (FIG. 1b) and ellipsometry (FIG. 3b), it can be concluded that the results from both techniques are in reasonable agreement.

Examples 4-5: Surface Modification of Glass with PEG

Glass microscope slides were cleaned by ultrasonication in acetone and isopropanol and activated by plasma oxidation to increase the number of silanol groups at the surface. Surface modification was carried out according to the general procedure as described above, using two different hydrosilanes in combination with PEG$_9$-OH-Acr as the reactive compound (A).

In example 4, a surface-modifying composition of trihydro-PEG, PEG$_9$-OH-Acr and DGDE is used. After 15 minutes of UV irradiation, the irradiated part of the surface has a WCA of 44°, a typical value for PEG-modified surfaces. The non-irradiated part has a WCA of 31°, indicating that no significant surface modification has taken place.

In example 5, the hydrosilane TMCTS is used in a surface-modifying composition further consisting of PEG$_9$-OH-Acr and DGDE. After 15 minutes of UV irradiation, the irradiated part of the surface has a WCA of 38°, a typical value for PEG-modified surfaces. The non-irradiated part has a WCA of 25, indicating that no significant surface modification has taken place.

Example 6: Hydrophobic Surface Modification of Oxidized Silicon(111)

Silicon (111) substrates were cleaned by ultrasonication in acetone and isopropanol and activated by plasma oxidation to increase the number of silanol groups at the surface. Surface modification was carried out according to the general procedure as described above, using a surface-modifying composition consisting of dihydro-F$_{17}$ as the hydrosilane, F$_{17}$—OH-Acr as the reactive compound (A) and 1 wt. % of benzophenone (BP). After 15 minutes of UV irradiation, WCA on the irradiated part of the sample increased to 132°. The non-irradiated part of the sample has a WCA of 75°. Even though the non-irradiated part of the sample has also become more hydrophobic, there is still a significant difference in the hydrophobicity between the irradiated and non-irradiated areas.

Example 7-8: Hydrophobic Surface Modification of Surfaces with Epoxide Groups

In example 7, glass surfaces with epoxide groups were prepared. For this purpose, glass microscope slides were treated with an epoxysilane according to a silanization procedure adapted from literature. Samples were cleaned by ultrasonicating in acetone for 5 minutes. Samples were dried using a stream of nitrogen and subsequently placed in an oven at 140° C. for 5 minutes. Then, samples were exposed to a low pressure O$_2$ plasma for 5 minutes and immediately immersed in a 2% (v/v) solution of (3-glycidyloxypropyl) trimethoxysilane in hexane for 2 hours. After silanization, samples were cleaned by 5 minutes ultrasonication in acetone and drying in a stream of nitrogen. After this silanization procedure, the epoxide-terminated surfaces have a WCA of 55°.

Surface modification was carried out according to the general procedure as described above, using a surface-modifying composition consisting of dihydro-F$_{17}$ as the hydrosilane and F$_{17}$—OH-Acr as the reactive compound (A). After 5 minutes of UV irradiation, WCA on the irradiated part of the sample increased to 140°, while WCA on the non-irradiated part remained unchanged at 56°.

In example 8, SU-8 was used as the substrate. SU-8 is a polymer with epoxy groups on its surface. SU-8 samples were cleaned by ultrasonication in isopropanol and dried using a stream of nitrogen. Surface modification was carried out according to the general procedure as described above, using a surface-modifying composition consisting of dihydro-F$_{17}$ as the hydrosilane and F$_{17}$—OH-Acr as the reactive compound (A). After 30 minutes of UV irradiation, WCA on the irradiated part of the sample increased to 130°, much higher than the WCA of non-modified SU-8 (75°).

Example 9: Hydrophobic Surface Modification of COG

COC samples were cleaned by ultrasonication in acetone, followed by exposure to a low pressure O$_2$ plasma to create hydroxyl groups on the surface. After thorough rinsing with deionized water, samples were dried using a stream of nitrogen. Surface modification was carried out according to the general procedure as described above, using different concentrations and ratios of trihydro-F$_{17}$ as the hydrosilane and F$_{17}$—OH-Acr as the reactive compound (A) (examples 9a-e).

After 30 minutes of UV irradiation, the irradiated part of the sample has a WCA of between 105 and 115°, significantly higher than the WCA on the non-irradiated area (60-65°). Note that the relatively low WCA on the non-irradiated side is caused by the plasma oxidation, which results in a decrease of the WCA of COC from approximately 95° to 65°. Therefore, the surface modification has resulted in a significant increase of the hydrophobicity also compared to non-oxidized COC.

Example 10: Surface Modification of COC with PEG

COC samples were cleaned by ultrasonication in acetone, followed by exposure to a low pressure O$_2$ plasma to create hydroxyl groups on the surface. After thorough rinsing with deionized water, samples were dried using a stream of nitrogen. Surface modification was carried out according to the general procedure as described above, using dihydro-PEG as the hydrosilane in combination with PEG$_9$-OH-Acr and PEG$_3$-OH-Acr as the reactive compounds (A).

In example 10a, a surface-modifying composition of dihydro-PEG, PEG$_9$-OH-Acr and DGDE is used. After 30 minutes of UV irradiation, the irradiated part of the surface has a WCA of 44°, a typical value for PEG-modified surfaces. The non-irradiated part has a WCA of 66°, indicating that no significant surface modification has taken place. Note that the relatively low WCA on the non-irradiated side is caused by the plasma oxidation, which results in a decrease of the WCA of COC from approximately 95 to 65°.

In example 10b, a surface-modifying composition of dihydro-PEG, PEG$_3$-OH-Acr and DGDE is used. After 30 minutes of UV irradiation, the irradiated part of the surface has a WCA of 37°, a typical value for PEG-modified surfaces. The non-irradiated part has a WCA of 66°, indicating that no significant surface modification has taken place. Note that the relatively low WCA on the non-irradiated side is caused by the plasma oxidation, which results in a decrease of the WCA of COC from approximately 95 to 65°.

Examples 11: Hydrophobic Surface Modification of Polycarbonate

Polycarbonate samples were cleaned by ultrasonication in isopropanol and dried using a stream of nitrogen. Surface modification was carried out according to the general procedure as described above, using dihydro-F$_{17}$ as the hydrosilane and F$_{17}$—OH-Acr as the reactive compound (A).

In example 11a, it is shown that after 30 minutes of UV irradiation, the WCA on the irradiated part of the sample is >130°, a large increase in hydrophobicity compared to non-treated polycarbonate (WCA 78°).

In this example, no surface activation by $O_2$ plasma was done before surface modification, so no hydroxyl groups were created at the surface. Polycarbonate itself does not have any C—OH groups. Still the surface is successfully modified, indicating that the presence of C—OH groups on the surface is not a requirement for photochemical surface modification according to the invention.

A control experiment with monofunctional additive $F_{17}$-Acr instead of the bifunctional reactive compound $F_{17}$—OH-Acr was done, indicated in the table as example 11b (control). In this case, no surface modification takes place and the WCA remains unchanged on the entire substrate.

In example 11c, it is shown that the presence of a hydrosilane is required for the surface modification to take place. If the hydrosilane (in this case dihydro-$F_{17}$) is replaced by the inert fluorinated solvent FC-70, no significant surface modification takes place, resulting in similar values of the WCA on the entire substrate.

Examples 12: Hydrophobic Surface Modification of PMMA

PMMA samples were cleaned by ultrasonication in isopropanol and dried using a stream of nitrogen. Surface modification was carried out according to the general procedure as described above, using dihydro-$F_{17}$ as the hydrosilane and $F_{17}$—OH-Acr as the reactive compound (A).

After 30 minutes of UV irradiation, the WCA on the irradiated part of the sample is >130°, a large increase in hydrophobicity compared to non-treated PMMA (WCA 75°).

In this example, no surface activation by $O_2$ plasma was done before surface modification, so no hydroxyl groups were created at the surface. PMMA itself does not have any C—OH groups. Still the surface is successfully modified, indicating that the presence of C—OH groups on the surface is not a requirement for photochemical surface modification according to the invention.

Example 13: Hydrophobic Surface Modification of PEEK

PEEK samples were cleaned by ultrasonication in isopropanol and dried using a stream of nitrogen. Surface modification was carried out according to the general procedure as described above, using trihydro-$F_{17}$ as the hydrosilane and $F_{17}$—OH-Acr as the reactive compound (A).

After 15 minutes of UV irradiation, the WCA on the irradiated part of the sample is >120°, a large increase in hydrophobicity compared to non-treated PEEK (WCA 70°).

In this example, no surface activation by $O_2$ plasma was done before surface modification, so no hydroxyl groups were created at the surface. PEEK itself does not have any C—OH groups. Still the surface is successfully modified, indicating that the presence of C—OH groups on the surface is not a requirement for photochemical surface modification according to the invention.

Examples 14-15: Hydrophobic Surface Modification of (Nitro)Cellulose

Surface modification of cellulose and nitrocellulose was carried out according to the general procedure as described above, using dihydro-$F_{17}$ as the hydrosilane and $F_{17}$—OH-Acr as the reactive compound (A).

In example 14, it is shown that after 15 minutes of UV irradiation, the cellulose has become highly hydrophobic (WCA>130°). On the non-irradiated area of the sample no WCA can be measured, since the water droplet is absorbed by the porous hydrophilic substrate (WCA<10°).

In example 15a, it is shown that nitrocellulose already becomes highly hydrophobic (WCA>130°) after less than 1 minute of UV irradiation if 1 wt. % of BP—$F_{10}$ is added to the surface-modifying composition as a photoinitiator. Again on the non-irradiated area of the sample no WCA can be measured.

In example 15b, it is shown that nitrocellulose can also be made hydrophobic without the addition of the photoinitiator. However, this requires a much longer UV irradiation time of 45 minutes. The non-irradiated area remains highly hydrophilic as the water droplet is absorbed by the porous substrate.

In example 15c, it is shown that the presence of a hydrosilane is required for the surface modification to take place. If the hydrosilane (in this case dihydro-$F_{17}$) is replaced by the inert fluorinated solvent FC-70 with 1 wt. % of photoinitiator, no significant surface modification takes place and the surface remains hydrophilic and the water droplet is absorbed by the porous substrate (WCA<10°).

Examples 16-25: Hydrophobic Surface Modification of Glass

Examples 16-19 show that the surface modification composition may comprise a variety of solvents. When DMP is used as a solvent, the highest WCA is obtained. However, also other solvents such as TFT and DGDE may be used. Even when water-saturated TFT is used (indicated as TFT (aq) in the table), a WCA of 110° is obtained, showing that the presence of water in the surface modifying composition does not prevent the formation of a hydrophobic surface modification layer. In examples 20-23, it is shown that a variety of hydrosilanes may be used for surface modification. All used hydrosilanes yield a surface modification layer with a thickness of several tens of nm and WCA values of >130° in combination with $F_{17}$—OH-Acr as the reactive compound (A), also when the hydrosilane does not contain a hydrophobic group. Examples 24 and 25 show that the surface modifying composition may comprise a large amount of solvent and still result in the formation of a hydrophobic surface modification layer.

Examples 26-28: Surface Modification of Glass with PEG

In examples 26-28, glass surfaces are modified using different surface modifying compositions, all comprising HO-PEG$_9$-MAcr as the reactive compound (A). Ellipsometry clearly shows the presence of a surface modification layer. In comparison with examples 4 and 5, in which PEG$_9$-OH-Acr is used, these examples show that the second type of reactive group in the reactive compound (A), in this case the hydroxy group, may be present at different positions in the molecule with respect to the first type of reactive group, in this case the (meth)acrylate group. Furthermore, these examples show that HO-PEG$_9$-MAcr may be used in surface modifying compositions comprising different hydrosilanes and different solvents.

Examples 29-30: Hydrophilic Surface Modification of COC and PP

The surface modification described in examples 29 and 30, using acrylic acid as the reactive compound (A), result in a strong decrease of the WCA when applied to COC and PP, two hydrophobic polymers.

Examples 31-32: Reactive Compounds (A) without Acrylate Group

Example 31 shows the formation of a surface modification layer on COC using PEG-diepoxide as reactive compound (A). Due the highly similar optical properties of the substrate and the surface modification layer, accurate determination of layer thickness by ellipsometry was not possible. However, XPS analysis of the modified surface shows the presence of Si and ether carbons (C—O—C), indicating that both TMCTS and PEG-diepoxide are incorporated in the surface modification layer.

In example 32, a surface modification layer is prepared on a quartz substrate using amino-trialkyne as the reactive compound (A). The surface modification layer has a thickness (determined by ellipsometry) of 17 nm. These examples show that surface modification layers can be prepared using reactive compounds (A) that contain only epoxide or alkyne groups, and do not contain polymerisable unsaturated groups (such as acrylate groups).

What is claimed is:

1. A process for the modification of a surface of a solid material, comprising the step of:
   contacting the surface with a surface-modifying composition under irradiation with light of a wavelength in the range of 200 to 800 nm optionally in the presence of a photoinitiator, wherein the solid material has surface groups selected from C—OH, Si—OH, C=O and C—O—C groups and wherein the surface-modifying composition comprises at least a hydrosilane and at least one reactive compound (A) other than the hydrosilane, wherein the at least ne reactive compound (A) comprises at least two functional groups selected from (meth)acrylate, (meth)acrylamide, hydroxyl, carboxylic acid, alkene, alkyne and epoxy, and
   wherein the amount of the hydrosilane in the composition ranges between 0.5 and 99 vol %, and wherein the vol % is determined at 20° C. relative to the total of the surface modifying composition,
   wherein the hydrosilane is represented by any of the hydrosilanes according to formula I), V) or III),

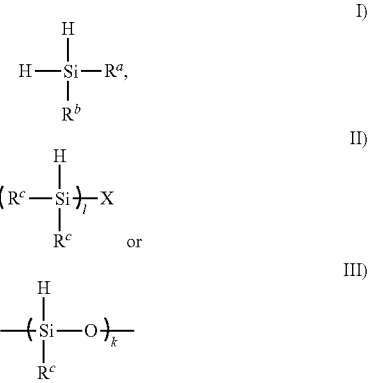

wherein $R^C$=H or methyl,
wherein $R^a$ is H, optionally substituted $C_{1-30}$ alkyl, optionally substituted $C_{2-30}$ alkenyl, optionally substituted $C_{2-30}$ alkynyl, optionally substituted $C_{6-20}$ aralkyl, optionally substituted $C_{6-10}$ aryl, or a polymeric moiety having a molecular weight of about 1000 to about 100,000,
wherein each of $R^b$ and X is, independently, optionally substituted $C_{1-30}$ alkyl, optionally substituted $C_{2-30}$ alkenyl, optionally substituted $C_{2-30}$ alkynyl, optionally substituted $C_{6-20}$ aralkyl, optionally substituted $C_{6-10}$ aryl, or a polymeric moiety having a number average molecular weight of about 1000 to about 100,000,
wherein the polymeric moiety is selected from the group consisting of hydrocarbon polymers, polyesters, polyamides, polyethers, polyacrylates, polyurethanes, epoxides, polymethacrylates and polysiloxanes, wherein I=2-10, and k=3-6.

2. The process according to claim 1, wherein the amount of hydrosilane and the at least one reactive compound (A) are together between 10-100 vol % of the surface modifying composition and wherein the amount of the at least one reactive compound (A) ranges between 1 and 50 vol %.

3. The process according to claim 1, wherein the amount of the photoinitiator ranges between 0 and 5.0 wt % relative to the surface-modifying composition.

4. The process according to claim 3, wherein the amount of the photoinitiator ranges between 0.001 to 1 wt. % relative to the surface-modifying composition.

5. The process according to claim 3, wherein the amount of the photoinitiator ranges between 0.01 to 0.1 wt. % relative to the surface-modifying composition.

6. The process according to claim 1, wherein the solid material is chosen from polyesters, polyethers, polyketones, polycarbonates, polyamides, polyurethanes, epoxyresins, polyalcohols, (meth)acrylate and (meth)acrylamide polymers, polyetherimides and silica containing solids.

7. The process according to claim 1, wherein the amount of the hydrosilane ranges from 50-99 vol %, the at least one reactive compound (A) ranges from 1-50 vol %, a solvent is present and the amount of solvent ranges from 0-30 vol %, and wherein the at least one reactive compound (A) is a hydrophobic compound having aliphatic or fluorinated substituents.

8. The process according to claim 1, wherein the amount of the hydrosilane ranges between 1 and 50 vol %, the amount of the at least one reactive compound (A) ranges between 5 and 50 vol %, and a solvent is present and the amount of the solvent ranges between 5 and 85 vol %, wherein the at least one reactive compound (A) is PEGylated.

9. The process according to claim 1, wherein the hydrosilane having a single hydrosilyl group include compounds represented by

where at least one of $R^a$, $R^b$ is a group represented by the formula selected from the following list of substituents 100-194 and the remaining $R^a$ is H, optionally substituted $C_{1-30}$ alkyl, optionally substituted $C_{2-30}$ alkenyl, optionally substituted $C_{2-30}$ alkynyl, optionally substituted $C_{6-20}$ aralkyl, optionally substituted $C_{6-10}$ aryl, or a polymeric moiety having a molecular weight of about 1000 to about 100,000, or $R^b$ is optionally substituted $C_{1-30}$ alkyl, optionally substituted $C_{2-30}$ alkenyl, optionally substituted $C_{2-30}$ alkynyl, optionally substituted $C_{6-20}$ aralkyl, optionally substituted $C_{6-10}$ aryl, or a polymeric moiety having a number average molecular weight of about 1000 to about 100,000, wherein the list consists of:

100)

101)
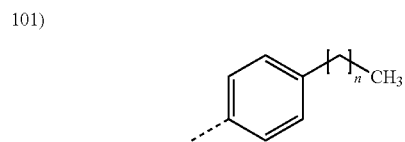

110)

111)
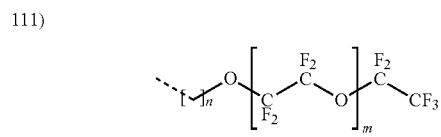

112)
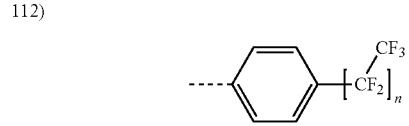

113)
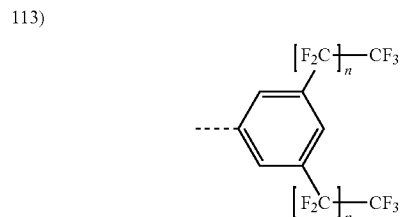

120)
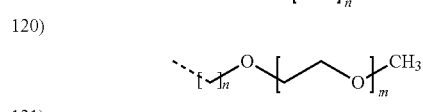

121)
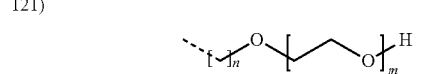

130)

131)

132)

133)

134)
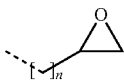

135)
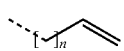

136)
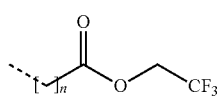

137)
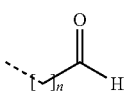

138)
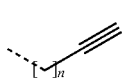

139)
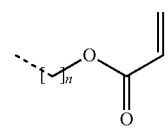

140)
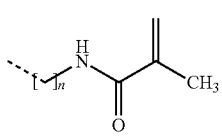

150)
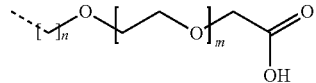

151)
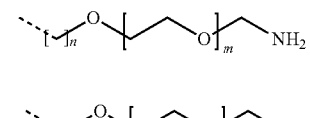

152)
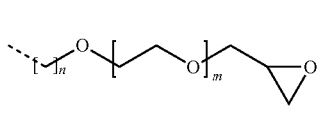

153)
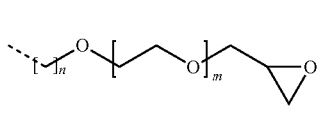

154)
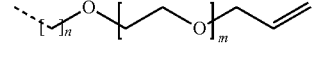

155)
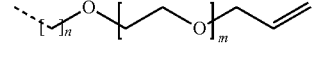

160)
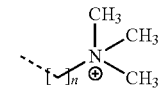

-continued
161) 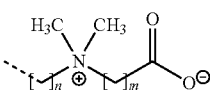
162) 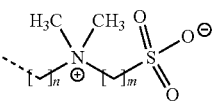
163) 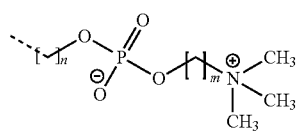
170) 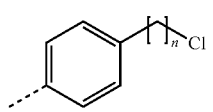
171) 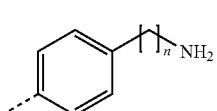
172) 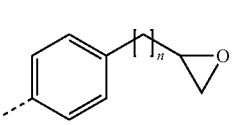
173) 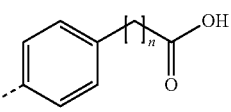
174) 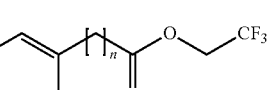
180) 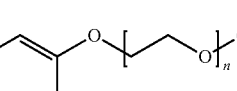
181) 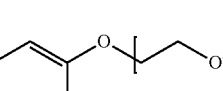
182) 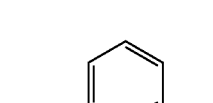
182) 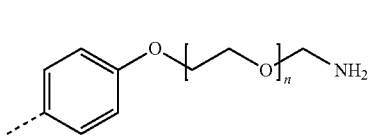
-continued
183) 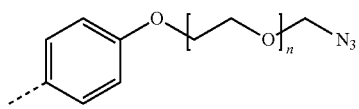
190) 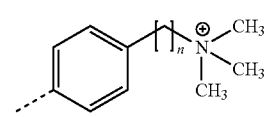
191) 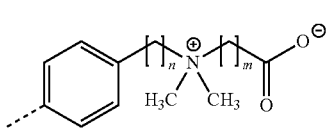
192) 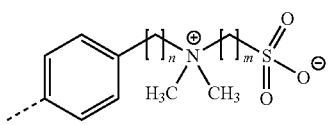
193) 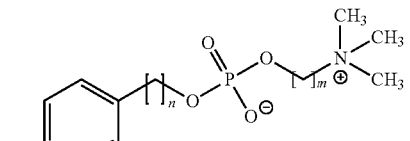
194) 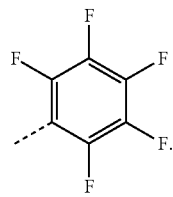
with all n = 1-20
and all m = 1-1000
10. The process according to claim 1, wherein the hydrosilane having at least two hydrosilyl groups is a compound selected from the following list of hydrosilanes with reference 200-263:
200) 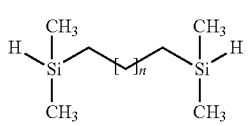
201) 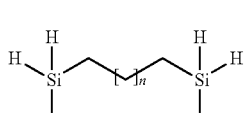
202) 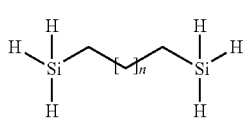

-continued
210) 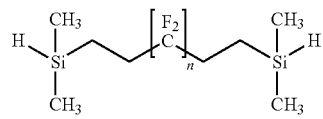
211) 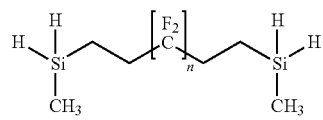
212) 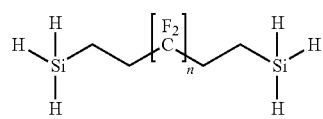
220) 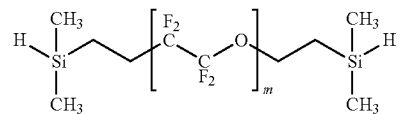
221) 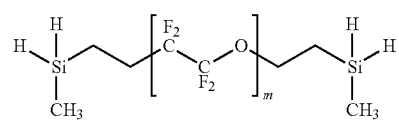
222) 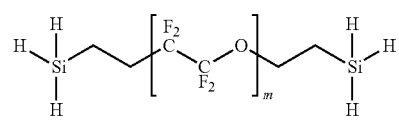
254) 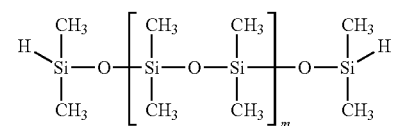
255) 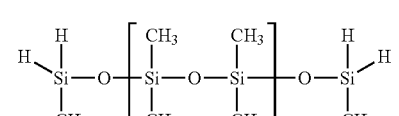
256) 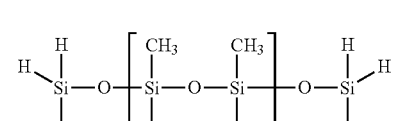
230) 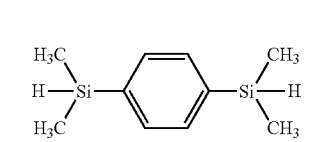
231) 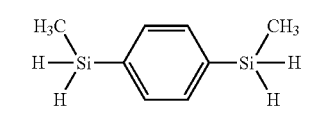
-continued
232) 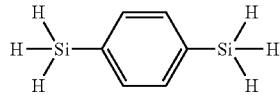
240) 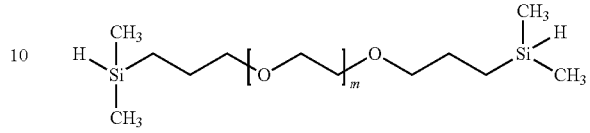
241) 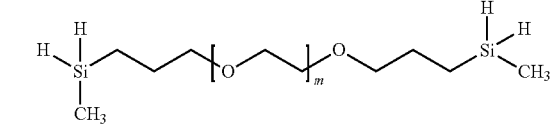
242) 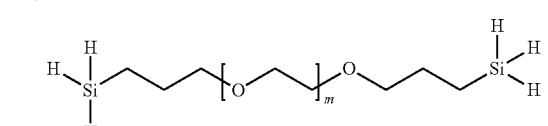
250) 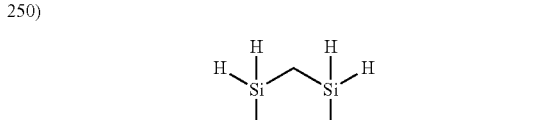
251) 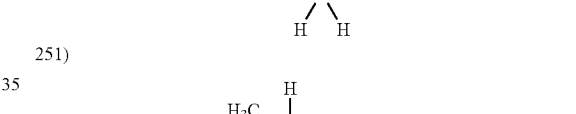
252) 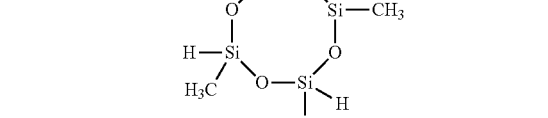
253) 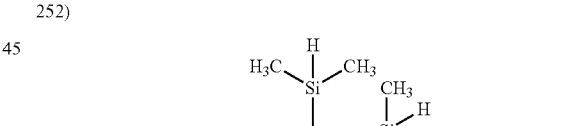

260)

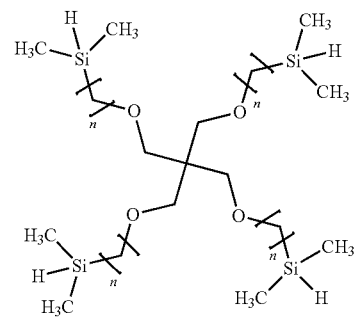

261)

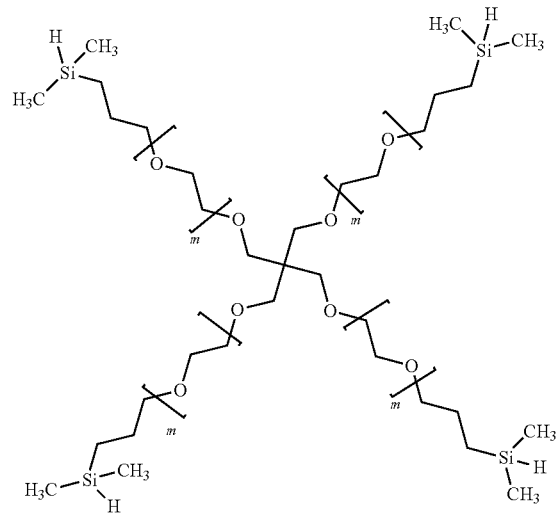

262)

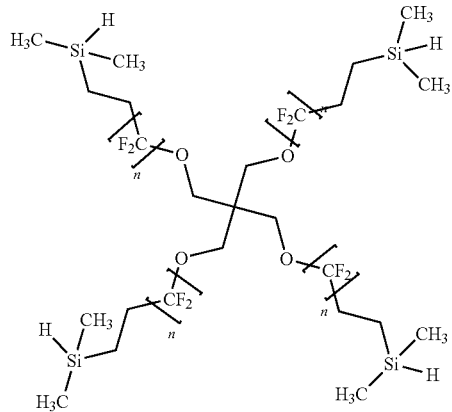

263)

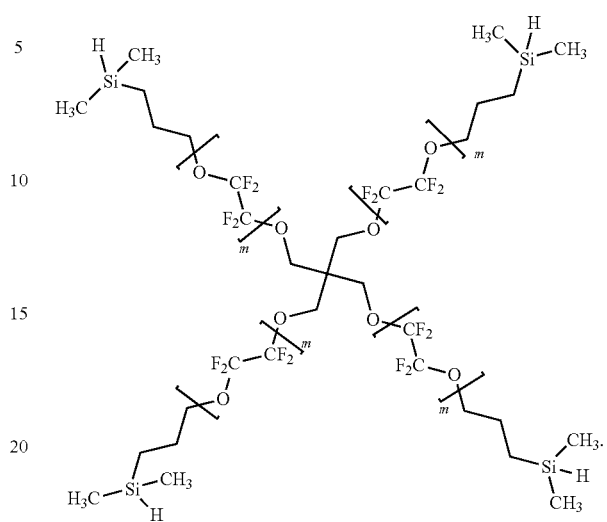

with all n = 1-20
and all m = 1-1000

11. The process according to claim 1, wherein the at least one reactive compound (A) comprises at least two hydroxyl groups or the at least one reactive compound (A) comprises i) at least one (meth)acrylate or one (meth)acrylamide as one type of reactive group and ii) at least one hydroxyl group as second type of reactive group.

12. The process according to claim 1, wherein the at least one reactive compound (A) is a compound selected from the following list of compounds 300-375, wherein n ranges between 1 and 20 and m ranges between 1 and 1000:

300)

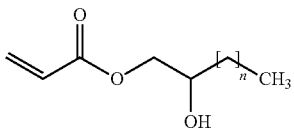

301)

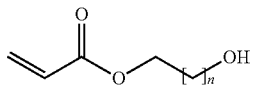

302)

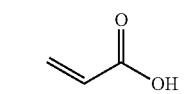

303)

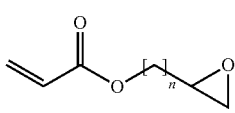

304)

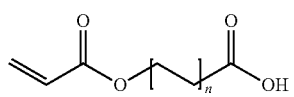

305) 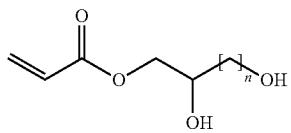
306) 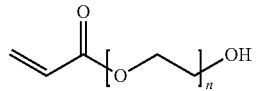
307) 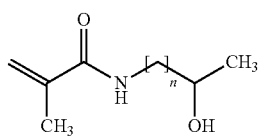
310) 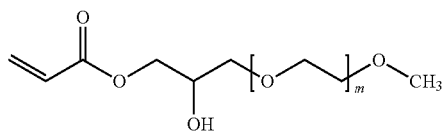
311) 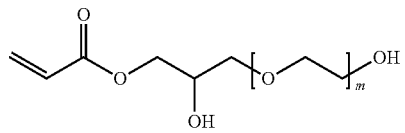
312) 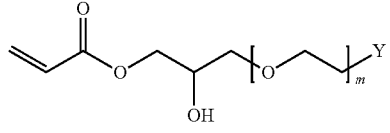
320) 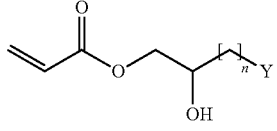
321) 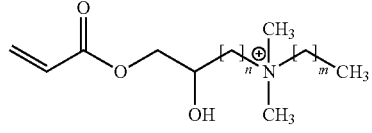
330) 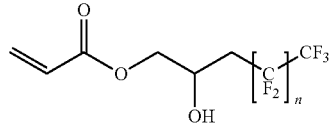
331) 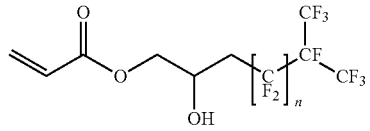
332) 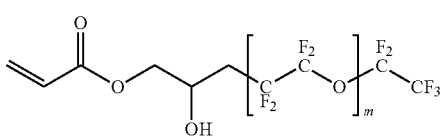
333) 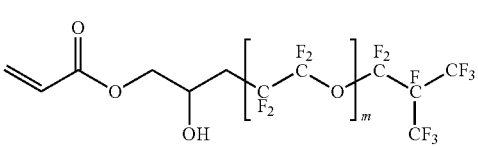
344) 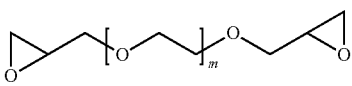
345) 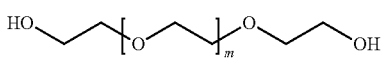
346) 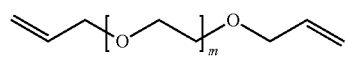
347) 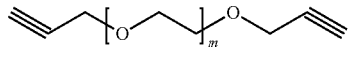
349) 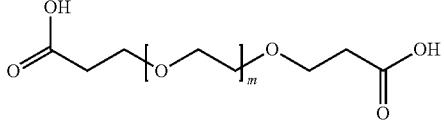
350) 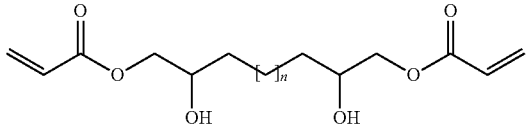
351) 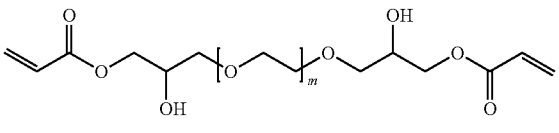
352) 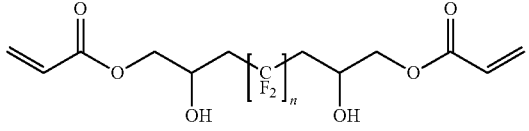
353) 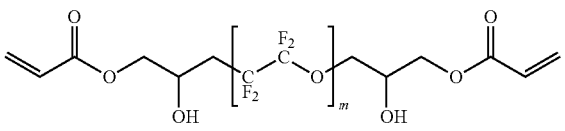

360) 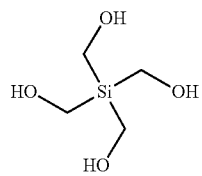
361) 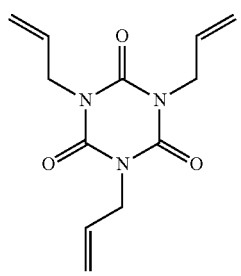
362) 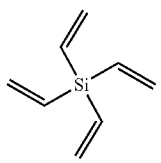
363) 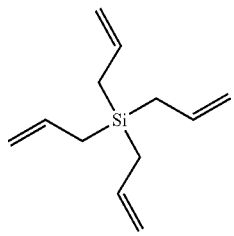
364) 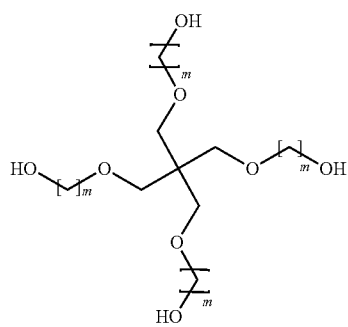
365) 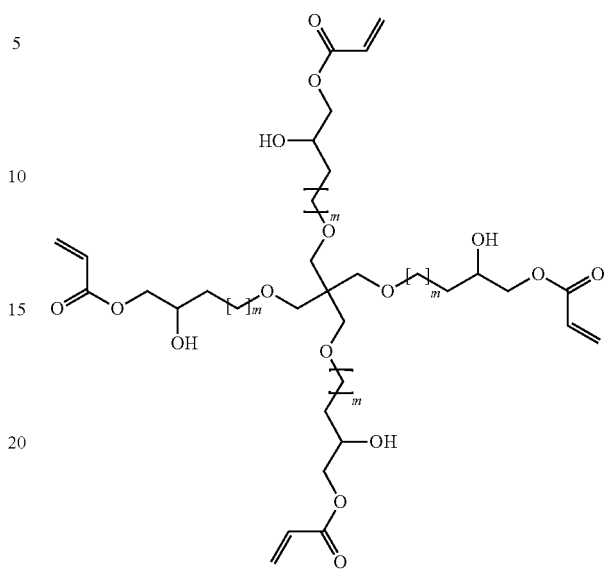
370) 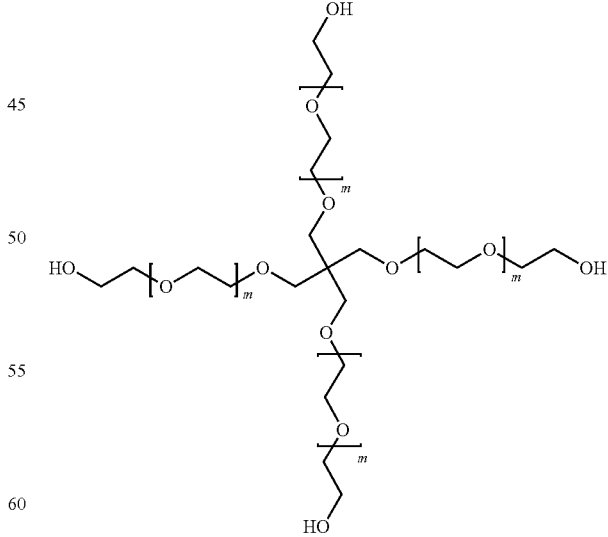

371) 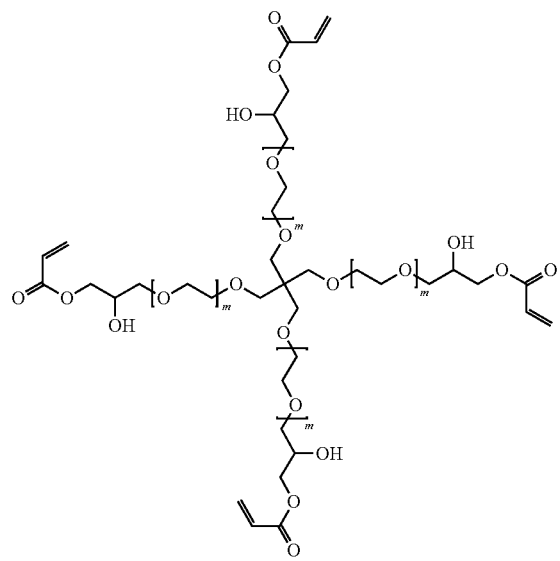

372) 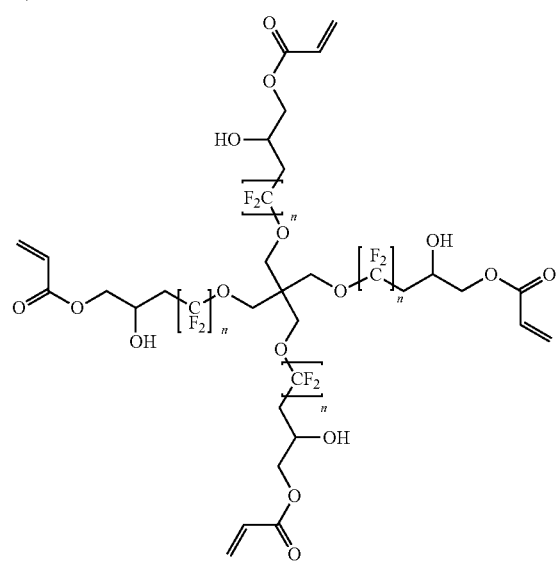

373) 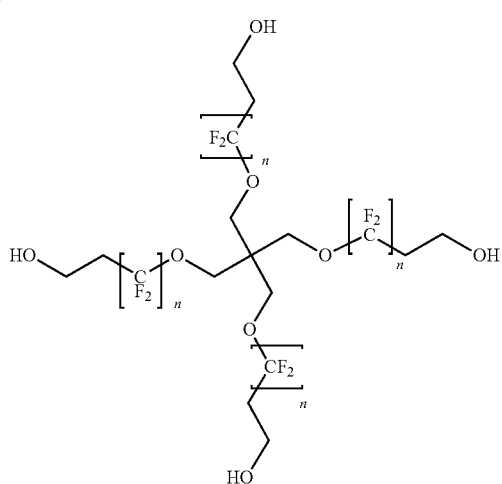

374) 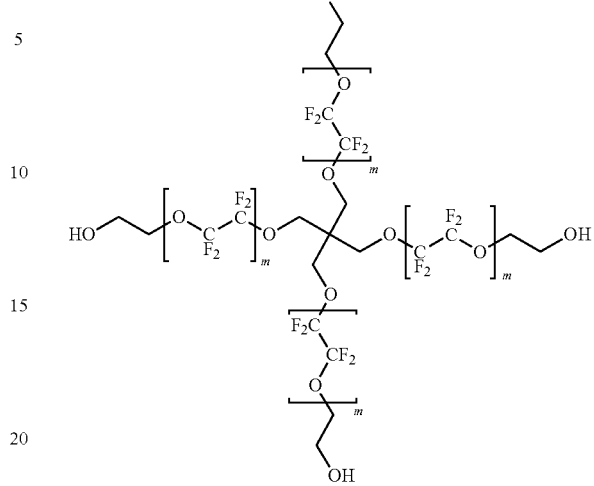

375) 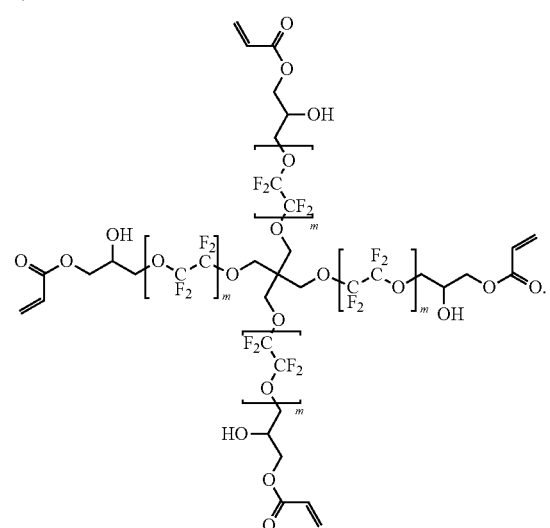

with all n = 1-20
and all m = 1-1000 with Y being azido, amine, PFP, NHS, COOH, aldehyde, alkene, alkyne, etc

13. The process according to claim 1, wherein the surface-modifying composition comprises microparticles and/or nanoparticles, wherein the microparticles and nanoparticles have a number average diameter of 0.1 nm to 10 μm as determined according to SEM.

14. The process according to claim 13, wherein the nanoparticles have a number average diameter of 10 nm to 100 nm as determined according to SEM.

15. The process according to claim 1, wherein I=2-4 and k=3-4.

* * * * *

UNITED STATES PATENT AND TRADEMARK OFFICE
CERTIFICATE OF CORRECTION

PATENT NO. : 11,884,579 B2
APPLICATION NO. : 16/967846
DATED : January 30, 2024
INVENTOR(S) : Rijo Da Costa Carvalho et al.

It is certified that error appears in the above-identified patent and that said Letters Patent is hereby corrected as shown below:

In the Claims

In Claim 1, Column 43, Line 40, replace "ne" with "one", and in Line 49, replace "V)" with "II".

In Claim 1, Column 44, Line 19, replace "I" with "1".

In Claim 10, Column 50, Lines 26-32, delete formula 250).

In Claim 10, Column 51, Lines 1-15, delete formula 260).

Signed and Sealed this
Nineteenth Day of March, 2024

Katherine Kelly Vidal
*Director of the United States Patent and Trademark Office*